United States Patent
Murakami

(10) Patent No.: US 8,086,089 B2
(45) Date of Patent: Dec. 27, 2011

(54) RECORDING APPARATUS

(75) Inventor: Naoyuki Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1156 days.

(21) Appl. No.: 11/845,483

(22) Filed: Aug. 27, 2007

(65) Prior Publication Data

US 2008/0063388 A1 Mar. 13, 2008

(30) Foreign Application Priority Data

Sep. 8, 2006 (JP) .................................. 2006-244505
Jul. 24, 2007 (JP) .................................. 2007-192164

(51) Int. Cl.
*H04N 9/80* (2006.01)
(52) U.S. Cl. ........................................ 386/241; 386/248
(58) Field of Classification Search .................. 386/200, 386/241, 248, 332
See application file for complete search history.

(56) References Cited

U.S. PATENT DOCUMENTS

| | | | | |
|---|---|---|---|---|
| 2004/0247296 | A1* | 12/2004 | Nakatani et al. | 386/96 |
| 2006/0110111 | A1* | 5/2006 | Van Gestel et al. | 385/95 |
| 2007/0014544 | A1* | 1/2007 | Kim | 386/112 |
| 2010/0111506 | A1* | 5/2010 | Kim et al. | 386/126 |

FOREIGN PATENT DOCUMENTS

JP 2005-004850 A 1/2005

* cited by examiner

*Primary Examiner* — Huy T Nguyen

(57) ABSTRACT

A recording apparatus includes a recording unit recording moving image data on a recording medium, a management information generation unit generating management information for first moving image data in response to recording the first moving image data on the recording medium, a consecutive reproduction information generation unit configured to generate first consecutive reproduction information indicating second moving image data to be reproduced consecutively after the first moving image data in response to recording the second moving image data on the recording medium, and a control unit, in response to recording the second moving image data on the recording medium, controlling the recording unit to add the first consecutive reproduction information to the management information for the first moving image data and to record the management information added with the first consecutive reproduction information on the recording medium.

12 Claims, 17 Drawing Sheets

FIG.10

| |
|---|
| type_indicator |
| version_number |
| SequenceInfo_start_address |
| ProgramInfo_start_address |
| CPI_stert_address |
| ClipMark_start_address |
| ExtensionData_start_addres |
| reserved_for_future_use |
| ClipInfo () |
| padding_word |

⎫ 1001

| |
|---|
| SequenceInfo () |
| padding_word |
| |
| ProgramInfo () |
| padding_word |
| |
| CPI () |
| padding_word |
| |
| ClipMark () |
| padding_word |
| |
| ExtensionData () |
| padding_word |

⎫ 1002

RECORDING APPARATUS

BACKGROUND OF THE INVENTION

1. Field of the Invention

The present invention relates to a recording apparatus. More specifically, the present invention relates to an apparatus configured to record moving image data.

2. Description of the Related Art

In recent years, an apparatus capable of recording moving image data on a disc-like shaped recording medium, such as a digital versatile disk (DVD), has been marketed. Furthermore, an apparatus has been recently marketed which is capable of recording high-quality moving image data on a very high-capacity disk medium, such as a Blu-ray Disc or a High Definition-DVD (HD-DVD), for a long period of time.

Such an apparatus encodes moving image data according to Moving Picture Experts Group (MPEG)-2 or MPEG-4 Part 10 Advanced Video Coding (AVC) (H.264) to compress the data amount and records the compressed data on a recording medium. In reproducing moving image data recorded in the above-described manner, it is necessary to decode the moving image data read from a disk medium to decompress the data. In decoding moving image data, it is necessary for an apparatus to verify a content of the moving image data read from a disk medium. That is, it is necessary, in this case, for an apparatus to refer to information about a temporal length, the number of pixels, and an aspect ratio of the moving image data.

In this regard, there is known a conventional method for separately recording information necessary for decoding moving image data as management information for the moving image data. With such a method, information necessary for decoding moving image data can be obtained without verifying the content of the moving image data. Accordingly, an apparatus using such conventional method can perform optimum processing for reproducing moving image data.

For example, in a case where moving image data is coded according to the MPEG coding method, the management information includes information about a position on a recording medium of an I picture in the moving image data. Accordingly, for example, a fast-forward reproduction can be implemented by consecutively reading only I pictures from the recording medium, decoding the read I pictures, and displaying the decoded pictures.

Such a conventional method is generally employed in a format for recording moving image data on a disk medium, such as DVD-Video format, DVD Video Recording (VR) format, and Blu-ray disk-read only memory (BD-ROM) format.

In reproducing a plurality of moving image data recorded on a disk medium, it is necessary to move an optical pickup unit to an address (track) of the disk medium on which moving image data to be reproduced is recorded. Such an operation for moving the optical pickup unit is referred to as a "seeking operation".

If a plurality of moving image data to be consecutively reproduced exists at mutually distant positions on a disk medium, a reproduction operation may be interrupted by a seeking operation. It is useful to seamlessly reproduce moving image data even when a plurality of moving image data to be consecutively reproduced exists at mutually distant positions on a disk medium.

In this regard, Japanese Patent Application Laid-Open No. 2005-4850 discusses a method in which identification information for identifying moving image data to be subsequently reproduced is included in management information as seamless information (consecutive reproduction information) in order to enable seamlessly reproducing moving image data.

The method discussed in Japanese Patent Application Laid-Open No. 2005-4850 is directed to address problems associated with reproduction only. Accordingly, in the case of recording moving image data in real time with a recording apparatus (e.g., a digital video camera) employing such a conventional method discussed in Japanese Patent Application Laid-Open No. 2005-4850, the following problems arise in recording management information on a recording medium.

That is, seamless information including identification information for identifying moving image data to be subsequently reproduced cannot be generated before recording the moving image data. Accordingly, in recording moving image data in real time, management information is recorded after moving image data to be subsequently reproduced is completely recorded.

In generating management information, if all moving image data to be recorded on a disk medium has been previously and completely captured and recorded, management information for seamless reproduction can be generated separately from the moving image data, and thus the generated management information can be recorded in association with the moving image data.

On the other hand, in recording moving image data in real time with a digital video camera, it is necessary to generate management information each time and at the same time as moving image data is recorded. However, the above-mentioned seamless information cannot be generated before completely recording subsequent moving image data. Thus, in recording moving image data in real time, management information cannot be generated before subsequent moving image data is completely recorded.

Accordingly, in the case of recording moving image data in real time, seamless information cannot be recorded on a recording medium at the same time as recording the moving image data.

SUMMARY OF THE INVENTION

The present invention is directed to a recording apparatus configured to, when recording moving image data on a recording medium, record information for consecutive reproduction.

According to an aspect of the present invention, a recording apparatus includes a recording unit configured to record moving image data on a recording medium; a management information generation unit configured to generate management information for first moving image data in response to the recording unit recording the first moving image data on the recording medium; a consecutive reproduction information generation unit configured to generate first consecutive reproduction information indicating second moving image data to be reproduced consecutively after the first moving image data in response to the recording unit recording the second moving image data on the recording medium on which the first moving image data is recorded; and a control unit configured to, in response to the recording unit recording the second moving image data on the recording medium, control the recording unit to add the first consecutive reproduction information to the management information for the first moving image data and to record the management information added with the first consecutive reproduction information on the recording medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 10 illustrates content of the clip information recorded on a recording medium according to the fifth exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
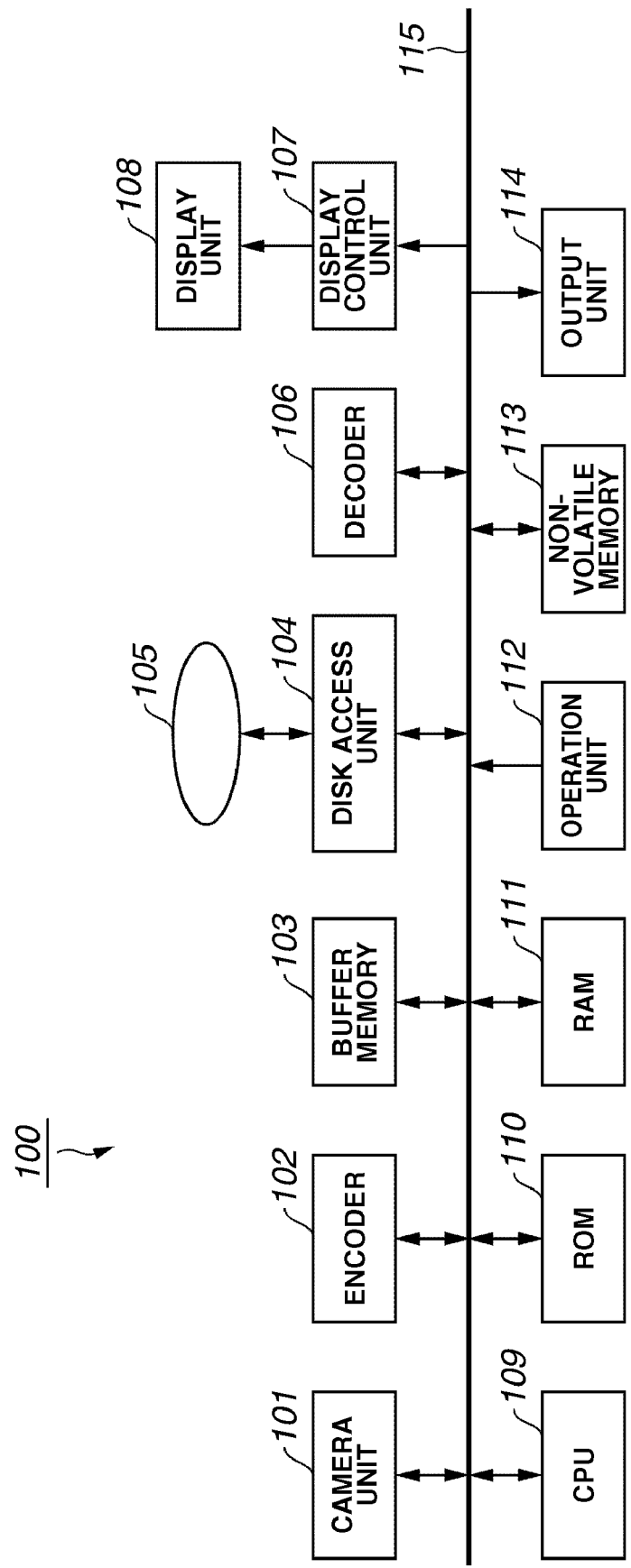
FIG. 1 illustrates an exemplary configuration of a video camera according to a first exemplary embodiment of the present invention.

Now, a first exemplary embodiment of the present invention will be described below. FIG. 1 illustrates an exemplary configuration of a video camera 100 according to the first exemplary embodiment of the present invention.

Referring to FIG. 1, the video camera 100 includes a camera unit 101, an encoder 102, a buffer memory 103, a disk access unit 104, a decoder 106, a display control unit 107, a display unit 108, a central processing unit (CPU) 109, a read-only memory (ROM) 110, a random access memory (RAM) 111, an operation unit 112, a non-volatile memory 113, and a video output unit 114. The above-described components of the video camera 100 are in communication with one another via a system bus 115. With such a configuration, the video camera 100 can record and reproduce moving image data on and from a disk-shaped recording medium, such as a DVD.

The encoder 102 encodes moving image data. The buffer memory 103 stores data recorded on and reproduced from a disk 105. The disk access unit 104 writes and reads data on and from the disk 105. The decoder 106 decodes the moving image data recorded on the disk 105. The display unit 108 displays moving image data captured and sent from the camera unit 101, reproduced moving image data, and other information. The display control unit 107 controls a display operation of the display unit 108.

The video camera 100 can externally output, with the video output unit 114, the same video data as the video data displayed on the display unit 108.

The CPU 109 controls the ROM 110, the RAM 111, the operation unit 112, the non-volatile memory 113, and other blocks connected with one another via the system bus 115.

The operation unit 112 can send a user input via various operation keys and switches (not illustrated) to the CPU 109. Thus, the video camera 100 can perform various processing instructed via the operation unit 112.

The disk access unit 104 includes a disk mounting and ejection mechanism (not illustrated). The disk 105 can be mounted on or ejected from the video camera 100 to be freely exchanged via the disk mounting and ejection mechanism of the disk access unit 104. In an exemplary embodiment, an optical disk, such as a DVD-recordable (DVD-R) or a DVD-rewritable (DVD-RW), can be used as the disk 105.

Now, an operation performed by the video camera 100 for recording moving image data will be described below.

When the video camera 100 is powered on by a user operation performed via the operation unit 112, the CPU 109 sends the moving image data captured by the camera unit 101 to the display control unit 107. Then, the captured moving image is displayed on the display unit 108. At this time, a recording operation is suspended. When a user generates an instruction for starting recording via the operation unit 112 in this state, moving image data output from the camera unit 101 is sent to the encoder 102.

The encoder 102 encodes the input moving image data according to MPEG coding method. The moving image data coded by the encoder 102 is stored on the buffer memory 103.

The CPU 109 adds additional data to the moving image data stored on the buffer memory 103 according to a recording format and converts the moving image data into a format suitable for recording. The disk access unit 104 reads the moving image data stored on the buffer memory 103 after a predetermined amount of moving image data is stored on the buffer memory 103, and records the read moving image data on the disk 105.

In the present exemplary embodiment, moving image data is encoded according to MPEG coding method and the coded moving image data is recorded on the disk 105.

Here, the data format according to the BD-ROM format will be described. In the present exemplary embodiment, moving image data is recorded on the disk 105 according to the BD-ROM format.

Figure 2:
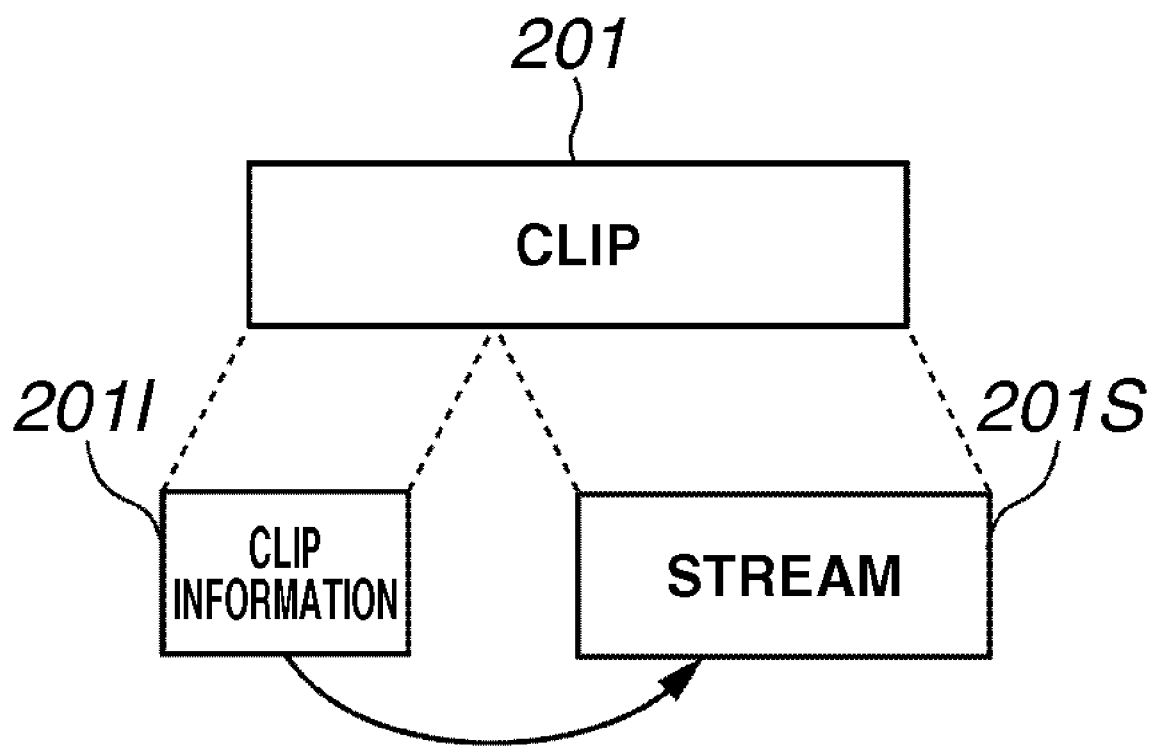
FIG. 2 illustrates an exemplary structure of a clip according to the first exemplary embodiment of the present invention.

FIG. 2 illustrates an exemplary structure of one moving image data according to the BD-ROM format.

In the BD-ROM format, the unit of one moving image data is referred to as a "clip". Referring to FIG. 2, a clip 201 includes two data of different kinds, namely, a stream 201S, which is moving image data, and clip information 201I, which is management information for the moving image data.

Each of the stream 201S and the clip information 201I exists as an independent file. Two files of the stream 201S and the clip information 201I constitute the clip 201. The stream 201S and the clip information 201I have the same clip number and, thus, are associated with each other.

The video camera 100 according to the present exemplary embodiment sets, as one clip, a series of moving image data recorded during a time period from a recording start instruction to a recording stop instruction generated via the operation unit 112. That is, in the case of recording moving image data in real time, as in the present exemplary embodiment, one clip is generated in every recording operation.

Figure 3:
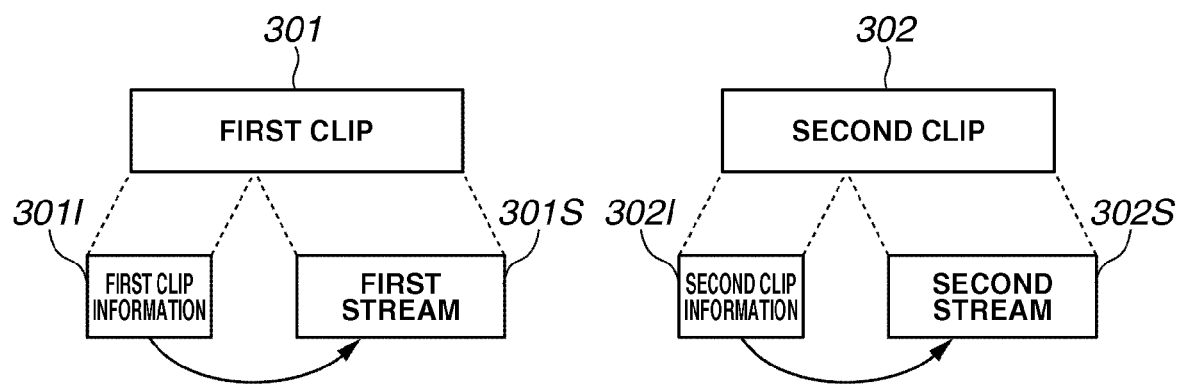
FIG. 3 illustrates two clips recorded on a recording medium according to the first exemplary embodiment of the present invention.

FIG. 3 illustrates two clips recorded on the disk 105 according to the present exemplary embodiment.

Referring to FIG. 3, a first clip 301 and a second clip 302 are recorded. The first clip 301 includes first clip information 301I and a first stream 301S. The second clip 302 includes second clip information 302I and a second stream 302S.

The first clip information 301I and the second clip information 302I do not include information about other clips. The first clip 301 and the second clip 302 exist independently from each other and have no mutual relationship. This state is referred to as a "non-seamless" (inconsecutive) state.

When moving image data is recorded in a non-seamless state, since the first clip information 301I does not include information about the next clip 302, a displayed moving image may temporarily stop during consecutive reproduction of the two clips 301 and 302.

In the case of recording moving image data in a non-seamless state, recording moving image data in real time can be relatively easily implemented. However, according to the capacity of a reproduction apparatus for reproducing moving image data recorded in real time, displayed (reproduced) moving image may stop between clips.

Figure 4:
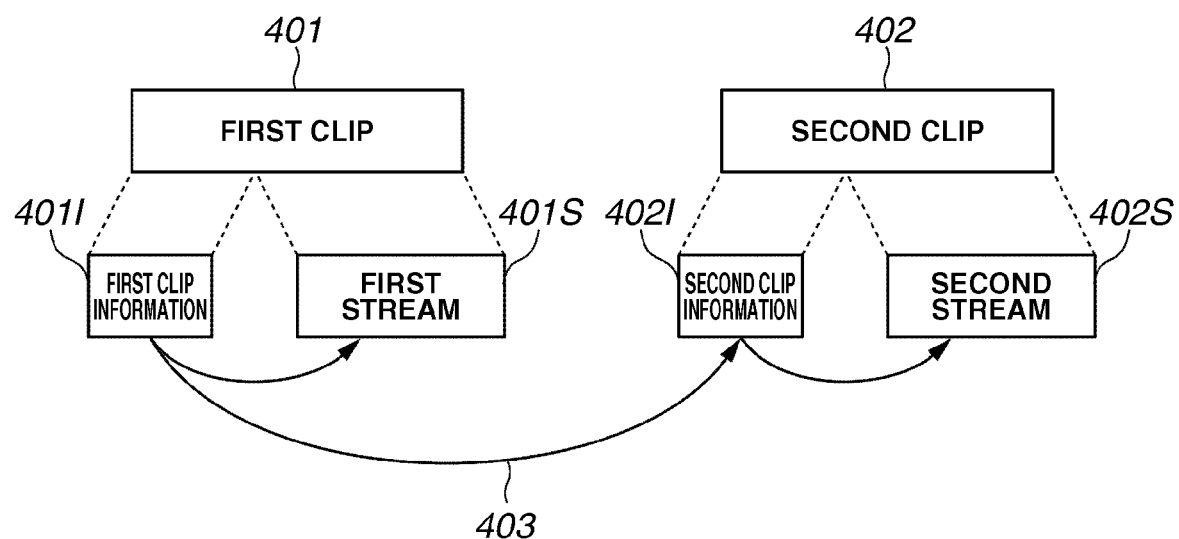
FIG. 4 illustrates two clips recorded on a recording medium according to the first exemplary embodiment of the present invention.

FIG. 4 illustrates two clips 401 and 402 recorded on the disk 105, as in the example in FIG. 3. The first clip 401 includes first clip information 401I and a first stream 401S and the second clip 402 includes second clip information 402I and a second stream 402S.

Referring to FIG. 4, a first clip 401 and a second clip 402 are recorded in a state enabling the recorded clips 401 and 402 to be seamlessly reproduced (that is, in a seamless state). That is, first clip information 401I of the first clip 401 includes information about the second clip 402. Accordingly, information about the second clip 402 is available during reproduction of the first clip 401. Thus, the first clip 401 and the second clip 402 can be consecutively reproduced without interruption.

An arrow 403 in FIG. 4 indicates that the first clip information 401I includes seamless information.

In a case where management information includes seamless information as described above, a reproduction address to which an optical pickup unit moves and decoding processing by a decoder are controlled according to the seamless information included in the management information. Thus, with such a data structure, in the case of reproducing two consecutive clips with an ordinary moving image reproduction apparatus, moving image data can be surely reproduced without being interrupted or stopping at a portion between clips.

As described above, clips can be in a non-seamless state or a seamless state. Accordingly, it is useful in reproducing moving image data without interruption or stopping to record moving image data in a seamless state.

The present exemplary embodiment, in recording moving image data in a seamless state, adjusts an amount of code of moving image data to be subsequently recorded according to an amount of code of previously recorded moving image data at the time the recording operation stops.

Figure 12:
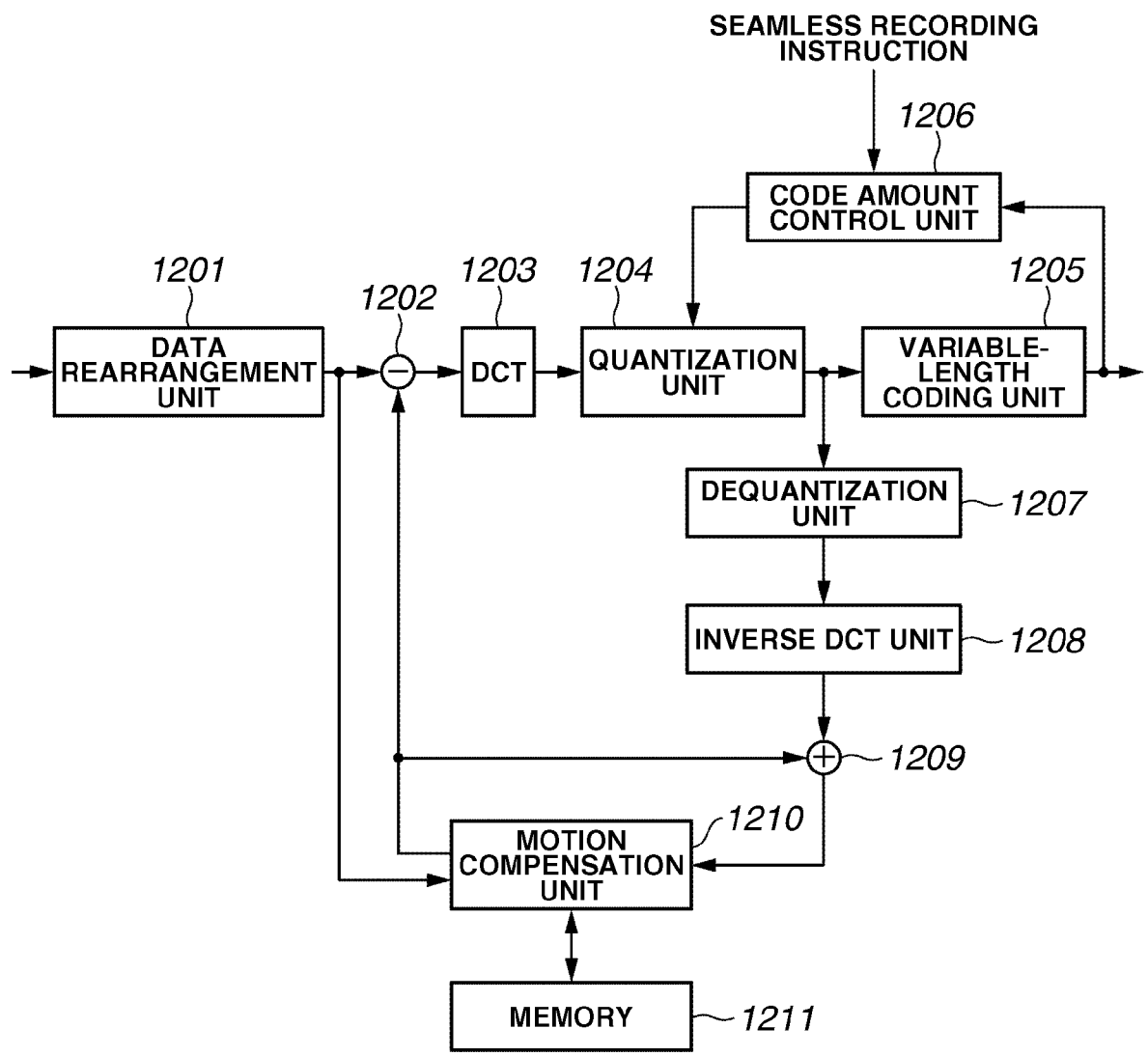
FIG. 12 illustrates an exemplary configuration of an encoder according to the first exemplary embodiment of the present invention.

FIG. 12 illustrates an exemplary configuration of the encoder 102 according to the present exemplary embodiment.

Referring to FIG. 12, moving image data output from the camera unit 101 is rearranged by a data rearrangement unit 1201 in an order appropriate for encoding into MPEG moving image data. Then, the rearranged moving image data is output to a subtracter 1202.

Data for a reference picture, which is output from a motion compensation unit 1210, is supplied to the subtracter 1202. After receiving the data for a reference picture, the subtracter 1202 calculates a difference between the moving image data output from the data rearrangement unit 1201 and the reference picture data output from the motion compensation unit 1210. The subtracter 1202 outputs a result of the calculation to a discrete cosine transform (DCT) unit 1203. If the data output from the data rearrangement unit 1201 is an I picture, the motion compensation unit 1210 outputs zero data (null data) instead of data for a reference picture.

The DCT unit 1203 performs DCT processing on the data output from the subtracter 1202. Then, the DCT unit 1203 outputs the DCT-processed data to a quantization unit 1204. The quantization unit 1204 quantizes a DCT coefficient sent from the DCT unit 1203 with a quantization step size, which has been designated by a code amount control unit 1206. Then, the quantization unit 1204 outputs the quantized data to a variable-length coding unit 1205 and a dequantization unit 1207.

After receiving the quantized data from the quantization unit 1204, the variable-length coding unit 1205 performs variable-length coding on the data output from the quantization unit 1204. Then, the variable-length coding unit 1205 outputs the variable length-coded data to the buffer memory 103 (FIG. 1) and the code amount control unit 1206 as MPEG-coded data. The dequantization unit 1207 dequantizes the quantized data output from the quantization unit 1204, and sends the dequantized data to an inverse DCT unit 1208.

The inverse DCT unit 1208 performs inverse DCT processing on the dequantized data output from the dequantization unit 1207. Then, the inverse DCT unit 1208 sends the inverse DCT-processed data to an adder 1209. The adder 1209 adds the data for reference picture output from the motion compensation unit 1210 to the inverse DCT-processed data output from the inverse DCT unit 1208. Then, the inverse DCT unit 1208 outputs the resulting data to the motion compensation unit 1210.

After receiving the data from the adder 1209, if the data sent from the adder 1209 is an I picture or a P picture, the motion compensation unit 1210 stores the I picture or P picture in a memory 1211 as data for a reference picture. Furthermore, the motion compensation unit 1210 calculates a motion vector for each macroblock including a predetermined number of pixels based on a picture to be coded, which is output from the data rearrangement unit 1201, and the data for a reference picture stored in the memory 1211. The motion compensation unit 1210 reads the data for a reference picture stored on the memory 1211 according to the calculated motion vector, and then sends the read data for a reference picture to the subtracter 1202 and the adder 1209.

The code amount control unit 1206 controls a quantization step size, which is to be used in the quantization unit 1204, according to an amount of generated code of the MPEG data output from the variable-length coding unit 1205. In the case of coding moving image data according to the MPEG method, it is necessary to control the amount of data stored on a buffer memory (video buffering verifier (VBV) buffer) used in decoding MPEG data such that data underflow or overflow does not occur in the buffer memory (VBV buffer).

The code amount control unit 1206 calculates the amount of data stored on the VBV buffer according to the amount of generated code output from the variable-length coding unit 1205, to control the quantization step size.

Furthermore, in the case of seamless recording, the code amount control unit 1206 controls the quantization step size such that, if the currently recorded moving image data is reproduced immediately after reproduction of previously recorded moving image data, data underflow or overflow does not occur in the VBV buffer.

More specifically, the code amount control unit 1206 stores, in a built-in register, information about the amount of data stored in the VBV buffer at the time recording of the moving image data is stopped. When the user generates an instruction for starting a next recording operation, the code amount control unit 1206 controls the quantization step size for the moving image data at the start of recording according to the stored amount of data in the VBV buffer.

Thus, an underflow of data stored in the VBV buffer can be prevented. Accordingly, two clips of MPEG data can be consecutively reproduced without interruption or stopping at the portion between clips.

On the other hand, in the case where seamless recording is not performed, the quantization unit 1204 quantizes currently recorded moving image data with a predetermined quantization step size regardless of the amount of data of previously recorded moving image data stored in the VBV buffer.

FIG. 10 illustrates an exemplary structure of clip information generated according to the BD-ROM format.

Referring to FIG. 10, the clip information includes two portions. Namely, the clip information in FIG. 10 includes clip information A 1001, which is illustrated in an upper portion of the clip information in FIG. 10, and clip information B 1002, which is illustrated in a lower portion of the clip information in FIG. 10. The clip information A 1001 includes data for managing the entire management information. The clip information B 1002 includes content of various information described in the clip information A 1001. A header portion of the clip information A 1001 includes information for managing the entire clip information, and includes a description "type_indicator", which indicates that the data is clip information.

A portion of the clip information A 1001 immediately after the header portion includes a description "version_number", which is used for identifying a version of the data format in the case where the data format is expanded. Portions thereafter respectively include descriptions about a start address of each of the blocks "ClipInfo, "SequenceInfo", "ProgramInfo", "CPI", "ClipMark", and "ExtensionData". The clip information further includes descriptions "ClipInfo", "SequenceInfo", "ProgramInfo", "CPI", "ClipMark", and "ExtensionData". Seamless information is described in the "ClipInfo" block.

The CPU 109 generates the above-described clip information and stores the generated clip information in the buffer memory 103. The disk access unit 104 reads the clip information from the buffer memory 103 at a predetermined timing and records the read clip information on the disk 105.

Figure 5A:
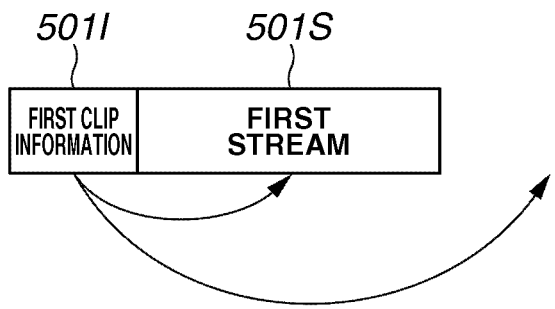
FIGS. 5A through 5C each illustrate a clip recorded on a recording medium according to the first exemplary embodiment of the present invention.
Figure 5B:
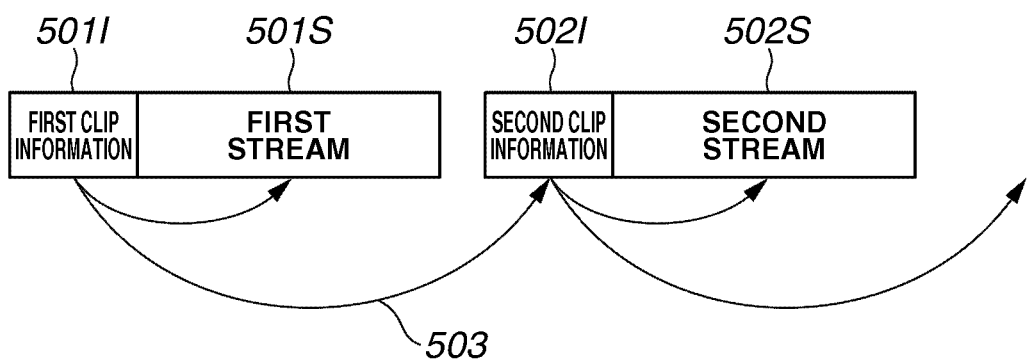
Figure 5C:
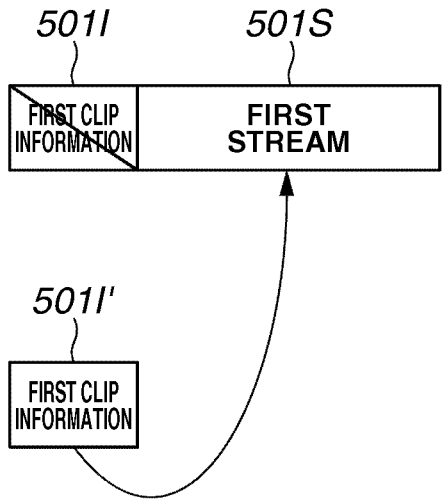

Now, processing for recording moving image data in a seamless state (seamless recording) according to the present exemplary embodiment will be described below with reference to a flow chart illustrated in FIG. 13 and also to FIGS. 5A through 5C. FIGS. 5A through 5C each illustrate recorded data according to the present exemplary embodiment.

Figure 13:
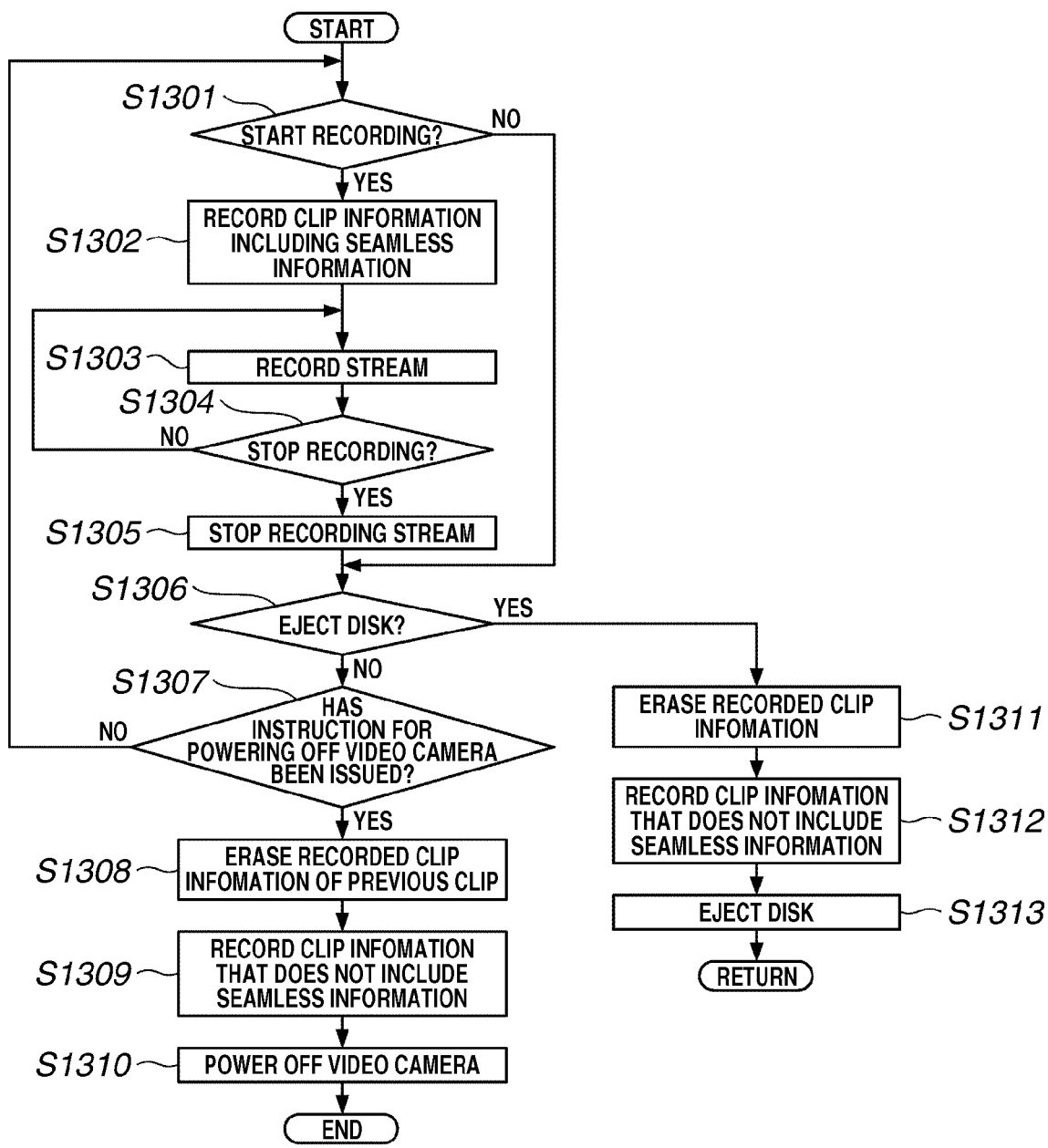
FIG. 13 is a flow chart illustrating an exemplary operation performed by the video camera according to the first exemplary embodiment of the present invention.

Referring to FIG. 13, in step S1301, in a state where the recording of moving image data is currently stopped, the CPU 109 determines whether a user has generated an instruction for starting recording via the operation unit 112. If it is determined in step S1301 that the user has generated an instruction for starting recording (YES in step S1301), then the CPU 109 advances to step S1302. On the other hand, if it is determined in step S1301 that the user has not generated an instruction for starting recording, then the CPU 109 advances to step S1306. In step S1302, the CPU 109 generates clip information including seamless information and records the generated clip information on the disk 105, and then advances to step S1303. In step S1303, the CPU 109 serially encodes moving image data and stores the MPEG moving image data (stream) on the disk 105.

In the present exemplary embodiment, at the time the recording of a stream is started, identification information for a clip to be recorded next is previously determined. The determined identification information is included in clip information. The clip information including the identification information is recorded on the disk 105.

In step S1304, the CPU 109 determines whether the user has generated an instruction for stopping recording in the above-described state. If it is determined in step S1304 that the user has generated an instruction for stopping recording (YES in step S1304), then the CPU 109 advances to step 1305. On the other hand, if it is determined in step S1304 that the user has not generated an instruction for stopping recording (NO in step S1304), then the CPU 109 returns to step S1303 to continue a recording operation. In step S1305, the CPU 109 stops recording the stream on the disk 105.

FIG. 5A illustrates data recorded on the disk 105 according to the present exemplary embodiment. Referring to FIG. 5A, information about a clip to be recorded subsequent to a first stream 501S, which has been currently recorded, is stored in first clip information 501I as seamless information.

FIG. 5B illustrates a state in which two clips are recorded on the disk 105 according to the present exemplary embodiment. Referring to FIG. 5B, identification information about a second clip (502I and 502S) is stored in the first clip information 501I as seamless information at the time of recording the first stream 501S. An arrow 503 indicates that the first stream 501S and the second stream 502S are subjected to seamless reproduction.

That is, at the time of recording the second stream 502S, the second clip is recorded according to the seamless information stored in the already recorded first clip information 501I.

However, in the following cases, the second stream 502S cannot be recorded according to the seamless information stored in the first clip information 501I. For example, when the disk 105 is ejected after the first stream 501S is recorded or when the video camera 100 is powered off after the first stream 501S is recorded, the disk 105 is ejected or the video camera 100 is powered off before recording of the second clip. Accordingly, in this case, the second clip, whose information is described in the seamless information in the first clip information 501I, is not recorded on the disk 105. This is contradictory to the seamless information in the first clip information 501I.

In order to avoid such a contradictory operation, in a state where the recording of moving image data is currently stopped, in step S1306 in FIG. 13, the CPU 109 determines whether the user has generated an instruction for ejecting the disk 105.

If it is determined in step S1306 that the user has generated an instruction for ejecting the disk 105 (YES in step S1306), then the CPU 109 advances to step S1311. In step S1311, the CPU 109 erases recorded clip information about a previously recorded clip from the disk 105, and then the CPU 109 advances to step S1312. In step S1312, the CPU 109 newly generates clip information that does not include seamless information and records the newly generated clip information on the disk 105. Then, the CPU 109 advances to step S1313. In step S1313, the CPU 109 ejects the disk 105 and returns to step S1301 to wait until the user generates an instruction for starting recording.

On the other hand, if it is determined in step S1306 that the user has not generated an instruction for ejecting the disk 105 (NO in step S1306), then the CPU 109 advances to step S1307. In step S1307, the CPU 109 determines whether the user has generated an instruction for powering off the video camera 100.

If it is determined in step S1307 that the user has not generated an instruction for powering off the video camera 100 (NO in step S1307), the CPU 109 returns to step S1301 to wait until the user generates an instruction for starting recording. On the other hand, if it is determined in step S1307 that the user has generated an instruction for powering off the video camera 100 (YES in step S1307), then the CPU 109 advances to step S1308. In step S1308, the CPU 109 erases recorded clip information about a previously recorded clip from the disk 105, and then advances to step S1309. In step S1309, the CPU 109 newly generates clip information that does not include seamless information and records the newly generated clip information on the disk 105. Then, the CPU 109 advances to step S1310. In step S1310, the CPU 109 ejects the disk 105 and ends the processing.

FIG. 5C illustrates recorded data at the time the disk 105 is ejected or the video camera 100 is powered off according to the present exemplary embodiment.

Referring to FIG. 5C, at the time the disk 105 is ejected or the video camera 100 is powered off, the CPU 109 erases the first clip information 501I including the seamless information from the disk 105. Furthermore, the CPU 109 newly generates first clip information 501I', which does not include seamless information. Then, the CPU 109 records the first clip information 501I' on the disk 105.

If the disk 105 is a write-once medium, such as a DVD-R, data recorded on the disk 105 cannot be erased therefrom. Accordingly, in the present exemplary embodiment, an area of the disk 105 in which the first clip information 501I is recorded is handled as an invalid area, and the CPU 109 records the newly generated first clip information 501I' in a separated another area of the disk 105.

If the disk 105 is a rewritable medium, such as a DVD-RW, recorded data can be overwritten. In this case, the CPU 109 overwrites the previously recorded first clip information 501I with the newly generated first clip information 501I'.

According to the present exemplary embodiment in which a moving image data clip is recorded in the above-described manner, management information including seamless information can be recorded. Accordingly, moving image data recorded in real time can be consecutively reproduced without interruption or stopping at a portion between clips.

In addition, in the present exemplary embodiment, management information is recorded according to the BD-ROM format. Accordingly, management information including seamless information can be recorded according to the BD-ROM format, and thus moving image data recorded according to the BD-ROM format can be consecutively displayed or reproduced.

Second Exemplary Embodiment

Now, a second exemplary embodiment of the present invention will be described below.

In the present exemplary embodiment, basic operations of the video camera 100 are similar to those in the first exemplary embodiment. The present exemplary embodiment is mainly different from the first exemplary embodiment in the following points. That is, in the present exemplary embodiment, in recording moving image data on the disk 105, the CPU 109 records clip information in a non-seamless state. Then, in recording the next clip, when the user generates an instruction for seamless recording, the CPU 109 overwrites the previously recorded clip information.

In the present exemplary embodiment, the user can arbitrarily select, via the operation unit 112 in a state where the recording is currently stopped, whether to record moving image data to be recorded next in a seamless state.

Figure 6A:
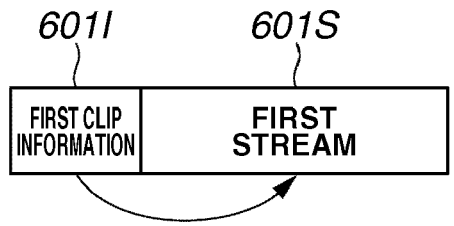
FIGS. 6A through 6C each illustrate a clip recorded on a recording medium according to a second exemplary embodiment of the present invention.
Figure 6B:
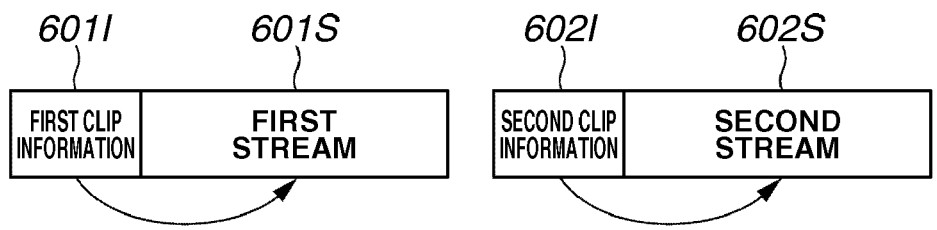
Figure 6C:
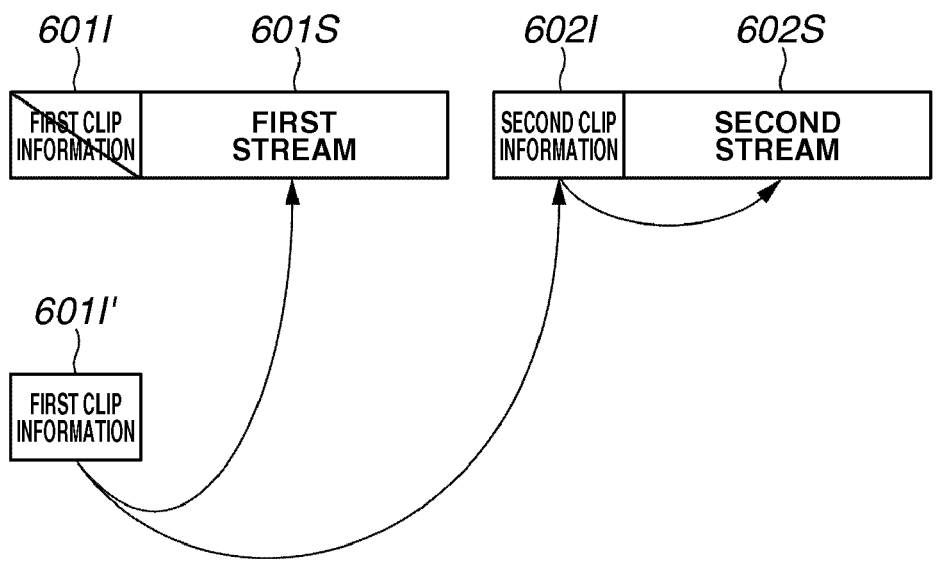

The operation of the video camera 100 according to the present exemplary embodiment will now be described below with reference to a flow chart illustrated in FIG. 14 and to FIGS. 6A through 6C. FIGS. 6A through 6C each illustrate recorded data according to the present exemplary embodiment.

Figure 14:
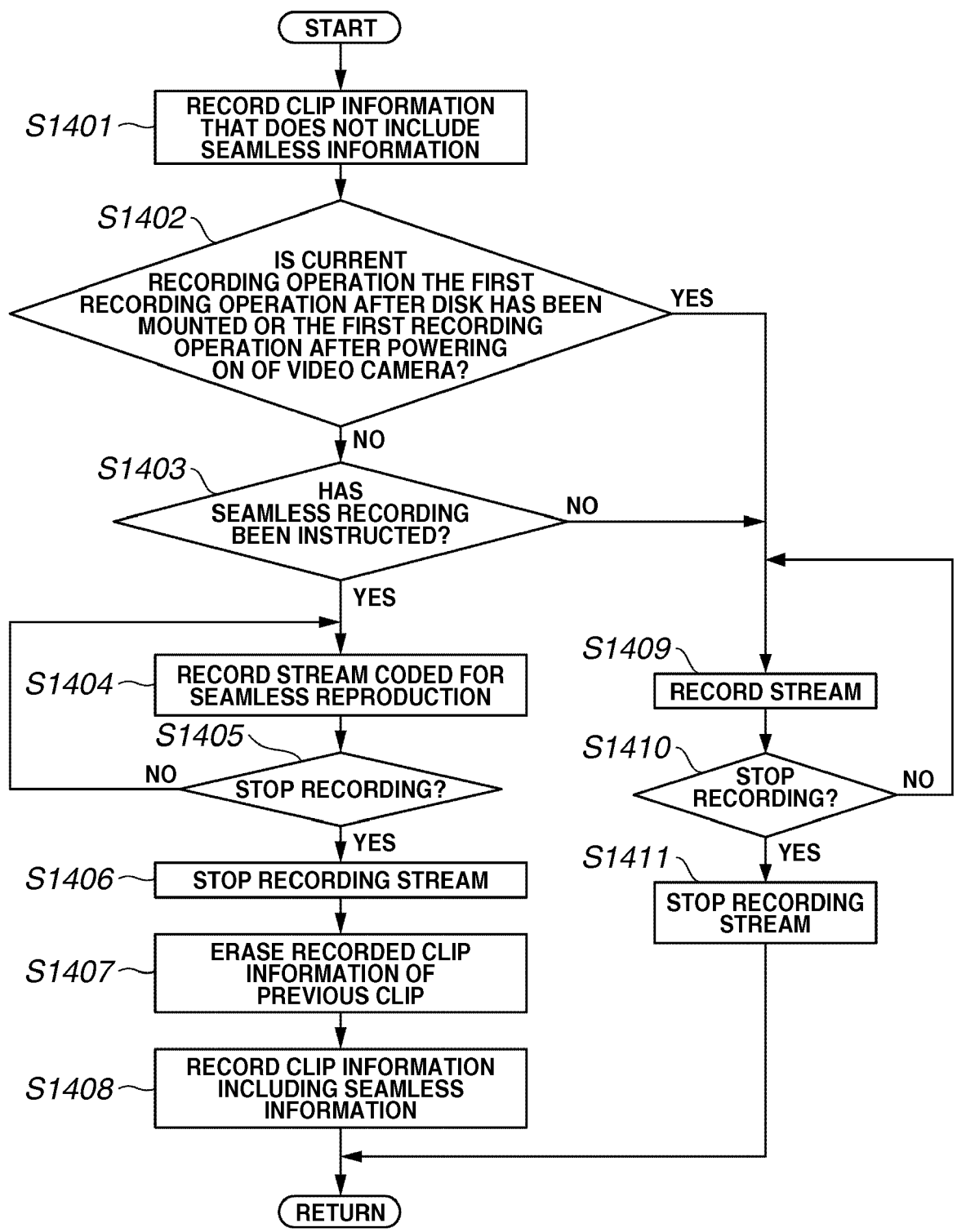
FIG. 14 is a flow chart illustrating an exemplary operation performed by the video camera according to the second exemplary embodiment of the present invention.

After the CPU 109 determines that a user has generated an instruction for starting recording via the operation unit 112 in a state where the recording of moving image data is currently stopped, the processing according to the flow chart of FIG. 14 starts. In step S1401, the CPU 109 generates clip information that does not include seamless information and records the generated clip information on the disk 105. Then, the CPU 109 advances to step S1402.

In step S1402, the CPU 109 determines whether the current recording operation is the first recording operation performed after the disk 105 has been mounted or the first recording operation performed after the video camera 100 has been powered on.

If it is determined in step S1402 that the current recording operation is the first recording operation performed after the disk 105 has been mounted or the first recording operation performed after the video camera 100 has been powered on (YES in step S1402), then the CPU 109 advances to step S1409. In step S1409, since a clip that has been previously recorded does not exist (that is, seamless recording of a previous clip and the current clip cannot be performed in this case), the CPU 109 encodes the moving image data without performing processing for seamless recording and then records the coded moving image data on the disk 105. Then, the CPU 109 advances to step S1410.

In step S1410, the CPU 109 determines whether the user has generated an instruction for stopping recording. If it is determined in step S1410 that the user has not generated an instruction for stopping recording (NO in step S1410), the CPU 109 returns to step S1409 to continue the recording operation. If it is determined in step S1410 that the user has generated an instruction for stopping recording (YES in step S1410), then the CPU 109 advances to step S1411. In step S1411, the CPU 109 stops recording the moving image data stream, and then ends the processing.

FIG. 6A illustrates the data recorded on the disk 105 at that time according to the present exemplary embodiment.

In FIG. 6A, first clip information 601I that does not include seamless information is recorded on the disk 105, as clip information for the first stream 601S, which has been currently recorded.

On the other hand, if it is determined in step S1402 that the current recording operation is neither the first recording operation performed after the disk 105 has been mounted nor the first recording operation performed after the video camera 100 has been powered on (NO in step S1402), then the CPU 109 advances to step S1403. In step S1403, the CPU 109 determines whether the user has generated an instruction for seamless recording via the operation unit 112. If it is determined in step S1403 that the user has not generated an instruction for seamless recording (NO in step S1403), then the CPU 109 advances to step S1409. In step S1409, the CPU 109 records moving image data as described above without performing processing for seamless recording.

FIG. 6B illustrates two clips recorded on the disk 105 in a case where the user has not generated an instruction for seamless recording. In FIG. 6B, clip information for each of a first clip (601I and 601S) and a second clip (602I and 602S) does not include seamless information.

On the other hand, if it is determined in step S1403 that the user has generated an instruction for seamless recording (YES in step S1403), then the CPU 109 advances to step S1404. In step S1404, the CPU 109 causes the encoder 102 to encode the subsequently recorded moving image data such that the subsequently recorded moving image data can be seamlessly reproduced consecutively to the previously recorded moving image data. The CPU 109 then records the encoded moving image data on the disk 105.

In step S1405, the CPU 109 determines whether the user has generated an instruction for stopping recording in the above-described state. If it is determined in step S1405 that the user has generated an instruction for stopping recording (YES in step S1405), then the CPU 109 advances to step S1406. On the other hand, if it is determined in step S1405 that the user has not generated an instruction for stopping recording (NO in step S1405), then the CPU 109 returns to step S1404 to continue the recording operation. In step S1406, the CPU 109 stops recording the moving image data on the disk 105, and then advances to step S1407.

In step S1407, the CPU 109 erases clip information for a clip that has been previously recorded on the disk 105, and then the CPU 109 advances to step S1408. In step S1408, the CPU 109 newly generates clip information including seamless information for the currently recorded clip, and then records the newly generated clip information on the disk 105.

FIG. 6C illustrates data recorded on the disk 105 when seamless recording has been instructed by the user according to the present exemplary embodiment. In the example illustrated in FIG. 6C, because the first clip information 601I does not include seamless information, a first stream 601S and a second stream 602S cannot be seamlessly reproduced. In this regard, the CPU 109 invalidates the previously recorded first clip information 601I and newly generates first clip information 601I' including seamless information. Then, the CPU 109 records the newly generated first clip information 601I' on the disk 105.

That is, the CPU 109 overwrites the first clip information 601I with the first clip information 601I', which includes seamless information.

According to the present exemplary embodiment, by recording moving image data by the above-described processing, seamless information can be recorded with a recording apparatus that records moving image data in real time, such as a digital video camera. Accordingly, moving image data can be consecutively reproduced without interruption or stopping.

In addition, in the present exemplary embodiment, clip information that does not include seamless information is recorded at the time of recording moving image data. Accordingly, it is not necessary to overwrite previously recorded clip information with newly generated clip information when the disk 105 is ejected or the video camera 100 is powered off.

Third Exemplary Embodiment

Now, a third exemplary embodiment of the present invention will be described below. In the present exemplary embodiment, basic operations of the video camera 100 are similar to those in the first exemplary embodiment.

As described above with reference to FIG. 5C and FIG. 6C, in the first and second exemplary embodiments, it is necessary to erase the recorded clip information and overwrite the clip information with newly generated clip information. Furthermore, in the case of using a write-once medium, such as a DVD-R, information recorded on such a medium cannot be erased later. Thus, a wasteful area can exist on a disk in this case.

In this regard, in the present exemplary embodiment, in recording moving image data, clip information corresponding to the moving image data is not recorded on the disk 105, and instead, the clip information is temporarily stored in a built-in memory. In recording moving image data to be subsequently recorded, after the user has determined whether to perform seamless recording, the clip information is recorded on the disk 105.

In the present exemplary embodiment also, the user can designate whether to perform seamless recording via the operation unit 112.

Figure 7A:
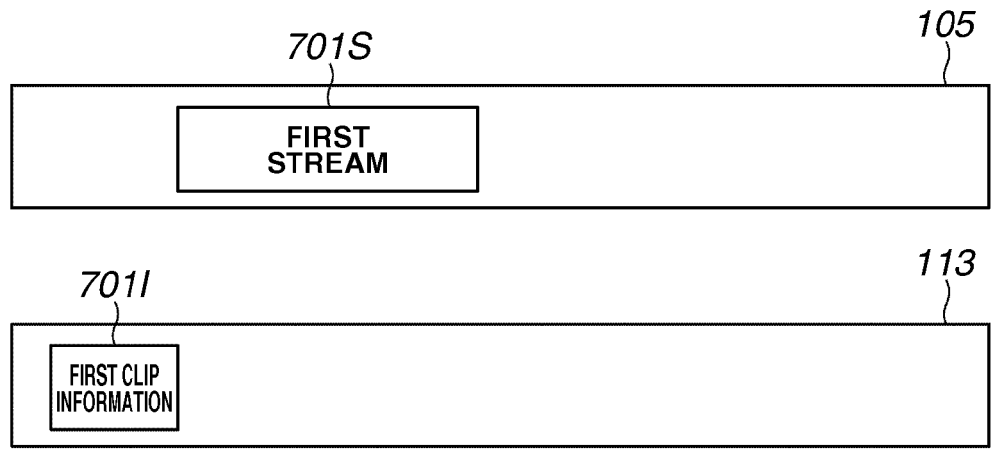
FIGS. 7A through 7C each illustrate a clip recorded on a recording medium according to a third exemplary embodiment of the present invention.
Figure 7B:
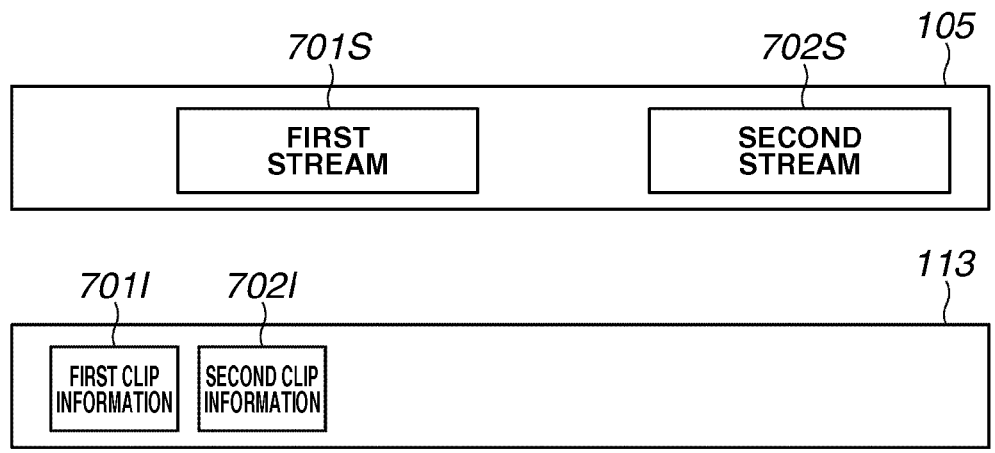
Figure 7C:
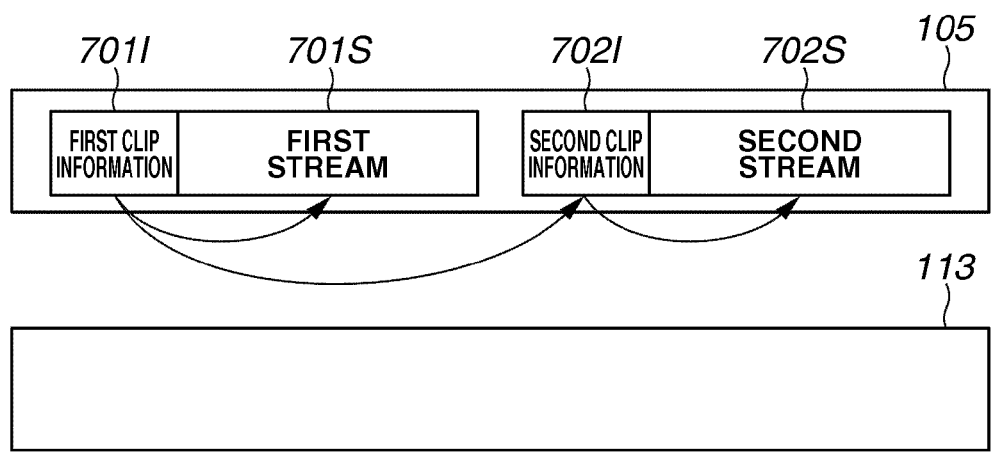

Processing according to the present exemplary embodiment will now be described below with reference to a flow chart illustrated in FIG. 15 and to FIGS. 7A through 7C. FIGS. 7A through 7C each illustrate recorded data according to the present exemplary embodiment.

Figure 15:
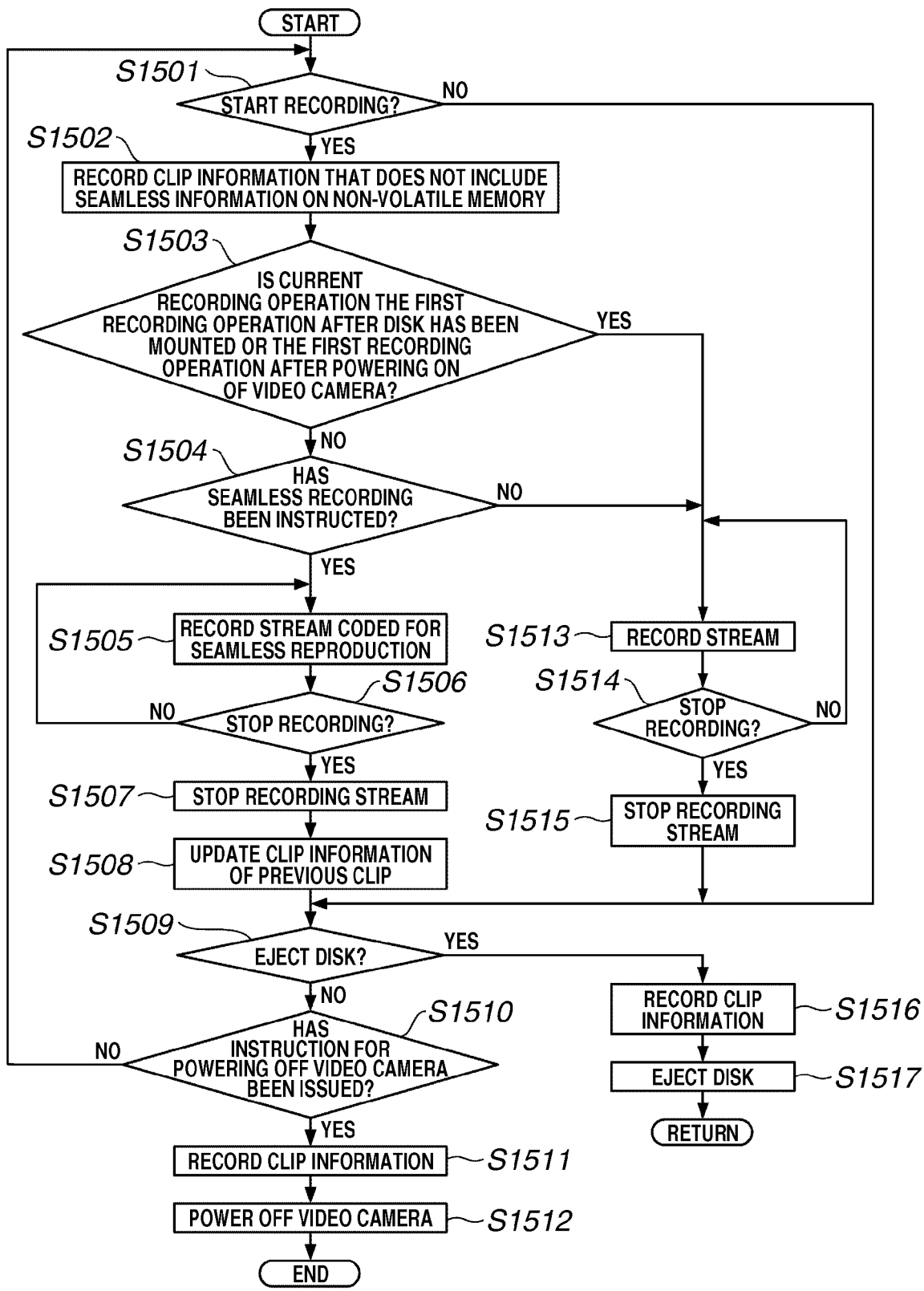
FIG. 15 is a flow chart illustrating an exemplary operation performed by the video camera according to the third exemplary embodiment of the present invention.

Referring to FIG. 15, in a state where the recording of moving image data is currently stopped, in step S1501, the CPU 109 determines whether the user has generated an instruction for starting recording via the operation unit 112. If it is determined in step S1501 that the user has generated an instruction for starting recording (YES in step S1501), then the CPU 109 advances to step S1502. On the other hand, if it is determined in step S1501 that the user has not generated an instruction for starting recording, then the CPU 109 advances to step S1509. In step S1502, the CPU 109 generates clip information that does not include seamless information and stores the generated clip information in the non-volatile memory 113, and then advances to step S1503.

In step S1503, the CPU 109 determines whether the current recording operation is the first recording operation performed after the disk 105 has been mounted or the first recording operation performed after the video camera 100 has been powered on.

If it is determined in step S1503 that the current recording operation is the first recording operation performed after the disk 105 has been mounted or the first recording operation performed after the video camera 100 has been powered on (YES in step S1503), then the CPU 109 advances to step S1513. In step S1513, since a clip that has been previously recorded does not exist (that is, seamless recording of a previous clip and the current clip cannot be performed in this case), the CPU 109 encodes the moving image data without performing processing for seamless recording and then records the coded moving image data on the disk 105. Then, the CPU 109 advances to step S1514.

In step S1514, the CPU 109 determines whether the user has generated an instruction for stopping recording. If it is determined in step S1514 that the user has not generated an instruction for stopping recording (NO in step S1514), then the CPU 109 returns to step S1513 to continue the recording operation. If it is determined in step S1514 that the user has generated an instruction for stopping recording (YES in step S1514), then the CPU 109 advances to step S1515. In step S1515, the CPU 109 stops recording the moving image data stream. Then, the CPU 109 advances to step S1509.

FIG. 7A illustrates data recorded on the disk 105 and data stored in the non-volatile memory 113 at that time according to the present exemplary embodiment.

In FIG. 7A, a first stream 701S is recorded on the disk 105. In this state, the user has not yet designated whether to record moving image data to be recorded next with seamless recording.

Accordingly, the CPU 109 stores in the non-volatile memory 113 first clip information 701I, which does not include seamless information, as clip information for the first stream 701S.

On the other hand, if it is determined in step S1503 that the current recording operation is neither the first recording operation performed after the disk 105 has been mounted nor the first recording operation performed after the video camera 100 has been powered on (NO in step S1503), then the CPU 109 advances to step S1504. In step S1504, the CPU 109 determines whether the user has generated an instruction for recording the moving image data with seamless recording via the operation unit 112. If it is determined in step S1504 that the user has not generated an instruction for recording the moving image data with seamless recording (NO in step S1504), then the CPU 109 advances to step S1513. In step S1513, the CPU 109 records the moving image data as described above.

FIG. 7B illustrates two recorded clips in the case where the user has not generated an instruction for recording moving image data with seamless recording according to the present exemplary embodiment.

In FIG. 7B, a first stream 701S of a first clip and a second stream 702S of a second clip are recorded on the disk 105. Clip information 701I and 702I stored in the non-volatile memory 113 for the first and the second clips does not include seamless information.

On the other hand, if it is determined in step S1504 that the user has generated an instruction for recording moving image data with seamless recording (YES in step S1504), then the CPU 109 advances to step S1505. In step S1505, the CPU 109 causes the encoder 102 to encode the subsequently recorded moving image data such that the subsequently recorded moving image data can be seamlessly reproduced consecutively to the previously recorded moving image data. Then, the CPU 109 records the coded moving image data on the disk 105. Then, the CPU 109 advances to step S1506.

In step S1506, the CPU 109 determines whether the user has generated an instruction for stopping recording. If it is determined in step S1506 that the user has generated an instruction for stopping recording (YES in step S1506), then the CPU 109 advances to step 1507. On the other hand, if it is determined in step S1506 that the user has not generated an instruction for stopping recording (NO in step S1506), then the CPU 109 returns to step S1505 to continue the recording operation. In step S1507, the CPU 109 stops recording the moving image data on the disk 105. Then, the CPU 109 advances to step S1508.

In step S1508, the CPU 109 updates the clip information for the previously recorded clip stored in the non-volatile memory 113 and stores in the non-volatile memory 113 the clip information including the seamless information for the clip that has been currently recorded. Then, the CPU 109 advances to step S1509. In step S1509, the CPU 109 determines whether the user has generated an instruction for ejecting the disk 105.

If it is determined in step S1509 that the user has generated an instruction for ejecting the disk 105 (YES in step S1509), then the CPU 109 advances to step S1516. In step S1516, the CPU 109 records each clip information stored in the non-volatile memory 113 at respective positions on the disk 105 designated by the user, and then advances to step S1517. In step S1517, the CPU 109 ejects the disk 105. Then, the processing ends.

On the other hand, if it is determined in step S1509 that the user has not generated an instruction for ejecting the disk 105 (NO in step S1509), then the CPU 109 advances to step S1510. In step S1510, the CPU 109 determines whether the user has generated an instruction for powering off the video camera 100.

If it is determined in step S1510 that the user has not generated an instruction for powering off the video camera 100 (NO in step S1510), the CPU 109 returns to step S1501. If it is determined in step S1510 that the user has generated an instruction for powering off the video camera 100 (YES in step S1510), then the CPU 109 advances to step S1511. In step S1511, the CPU 109 records each clip information stored in the non-volatile memory 113 at respective positions on the disk 105 previously designated by the user. Then, the CPU 109 advances to step S1512. In step S1512, the CPU 109 powers off the video camera 100. Then, the processing ends.

FIG. 7C illustrates clip information recorded on the disk 105 at the time the disk 105 is ejected or the video camera 100 is powered off according to the present exemplary embodiment. In a case where a second clip (702I and 702S), which has been designated to be recorded with seamless recording, is recorded after recording a first clip (701I and 701S), the CPU 109 adds seamless information to the first clip information 701I. When the user generates an instruction for ejecting the disk 105 or powering off 100 after the second stream 701S is completely recorded, the CPU 109 records on the disk 105 the first clip information 701I and second clip information 702I.

As described above, according to the present exemplary embodiment, seamless information can be recorded without wasting a recording area on the disk 105.

Fourth Exemplary Embodiment

Now, a fourth exemplary embodiment of the present invention will be described below. In the present exemplary embodiment, basic operations of the video camera 100 are similar to those in the first exemplary embodiment.

As described with reference to FIGS. 7A through 7C, in the third exemplary embodiment, it is necessary to store in the non-volatile memory 113 as many clip information as the number of clips to be recorded. Accordingly, in the third exemplary embodiment, as the number of clips to be recorded increases, the necessary capacity of the non-volatile memory 113 becomes larger.

In the present exemplary embodiment, clip information for a previously recorded clip is recorded on the disk 105 at the time the next stream is recorded, thus reducing the necessary capacity of the non-volatile memory 113.

Figure 8A:
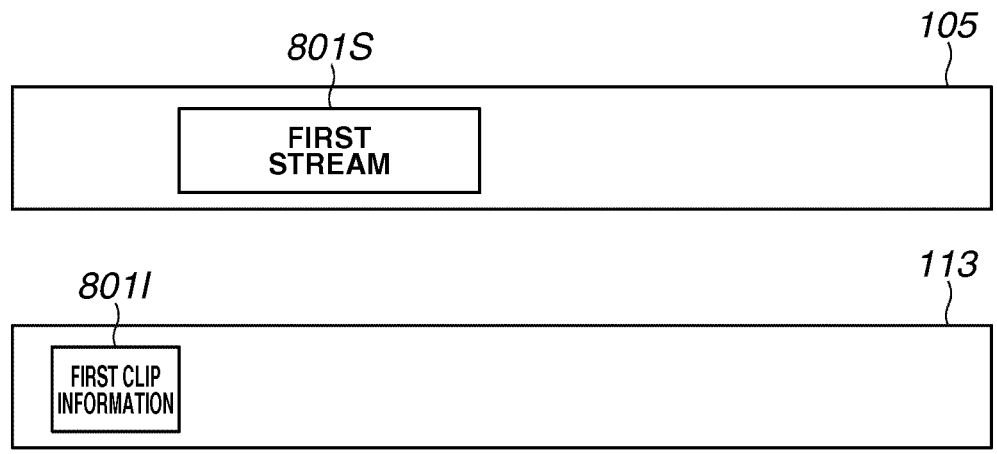
FIGS. 8A through 8C each illustrate a clip recorded on a recording medium according to a fourth exemplary embodiment of the present invention.
Figure 8B:
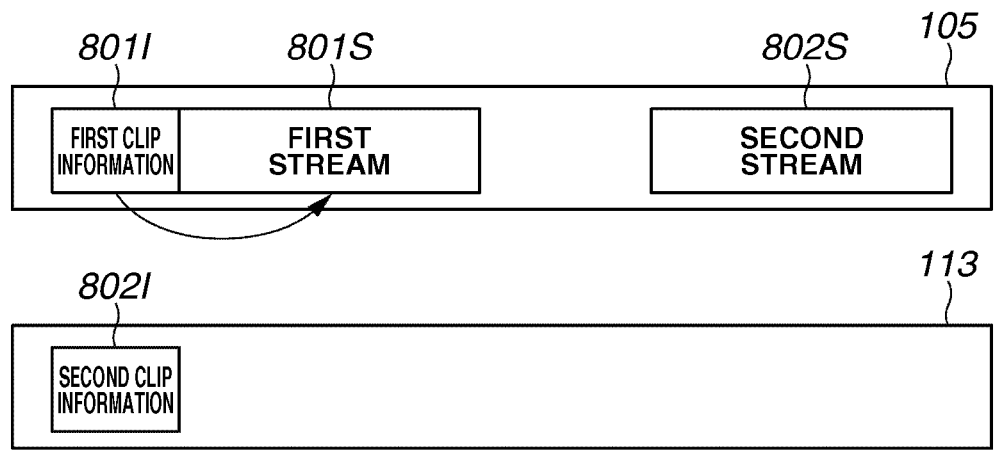
Figure 8C:
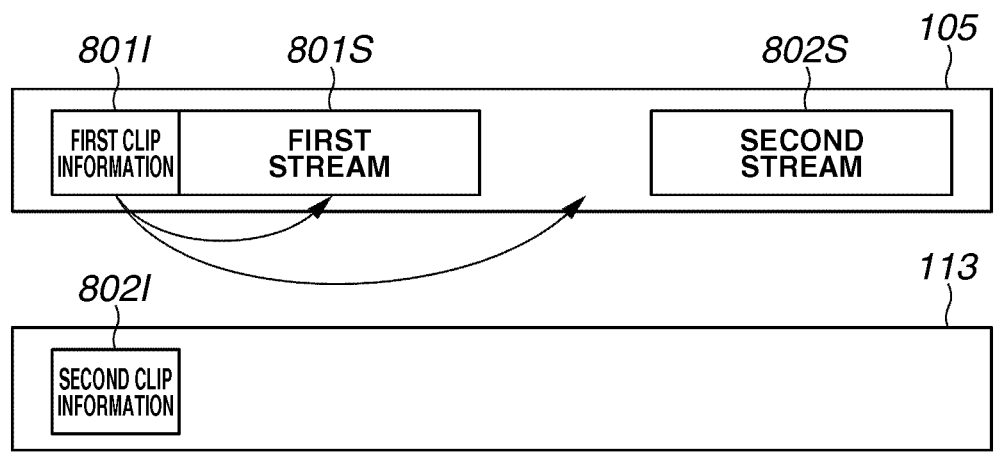

The operation according to the present exemplary embodiment will now be described below with reference to a flow chart illustrated in FIG. 16 and to FIGS. 8A through 8C. FIGS. 8A through 8C each illustrate recorded data according to the present exemplary embodiment.

Figure 16:
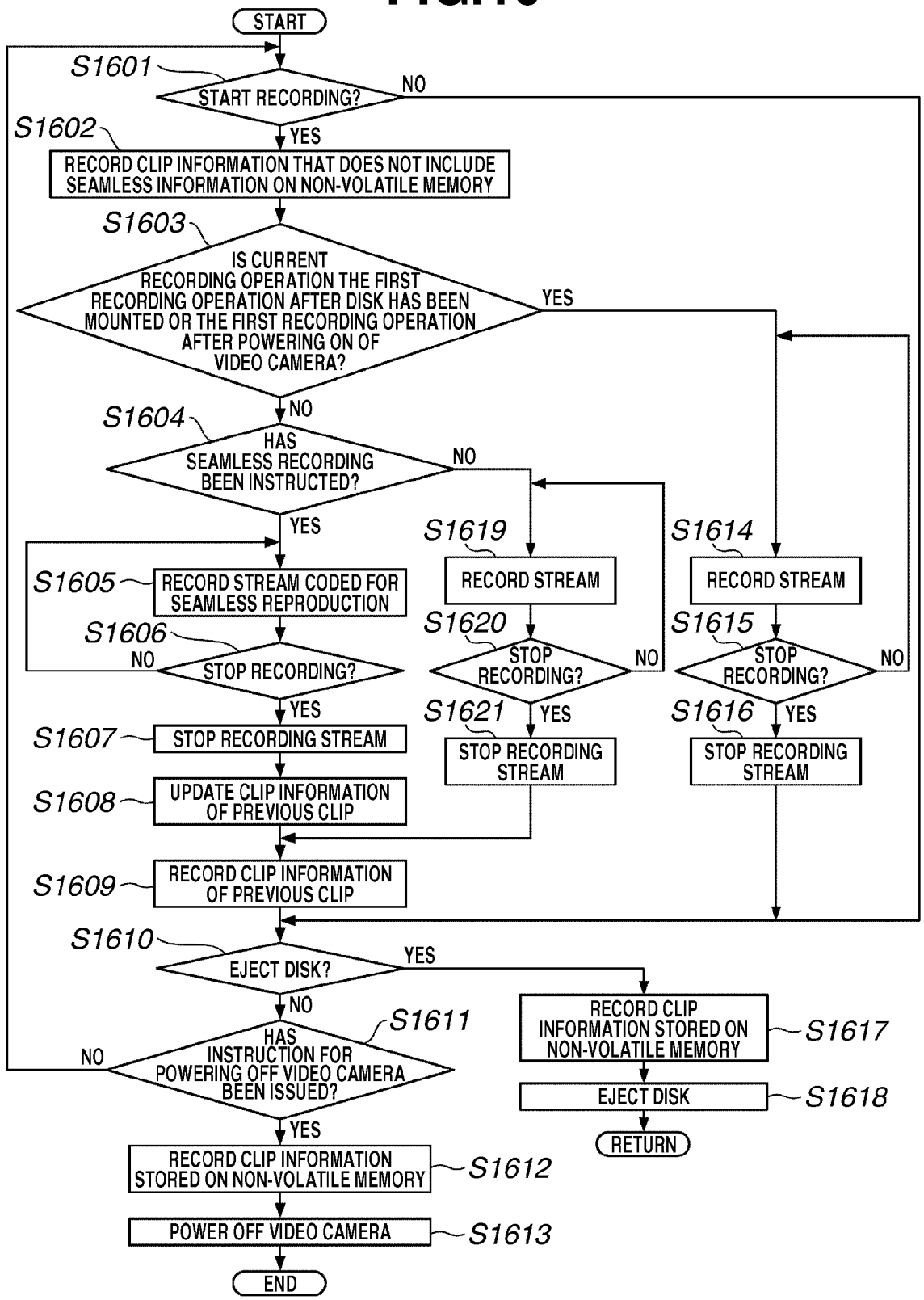
FIG. 16 is a flow chart illustrating an exemplary operation performed by the video camera according to the fourth exemplary embodiment of the present invention.

Referring to FIG. 16, in a state where the recording of moving image data is currently stopped, in step S1601, the CPU 109 determines whether the user has generated an instruction for starting recording via the operation unit 112. If it is determined in step S1601 that the user has generated an instruction for starting recording (YES in step S1601), then the CPU 109 advances to step S1602. On the other hand, if it is determined in step S1601 that the user has not generated an instruction for starting recording (NO in step S1601), then the CPU 109 advances to step S1610. In step S1602, the CPU 109 generates clip information that does not include seamless information and stores the generated clip information in the non-volatile memory 113. Then, the CPU 109 advances to step S1603.

In step S1603, the CPU 109 determines whether the current recording operation is the first recording operation performed after the disk 105 has been mounted or the first recording operation performed after the video camera 100 has been powered on.

If it is determined in step S1603 that the current recording operation is the first recording operation performed after the disk 105 has been mounted or the first recording operation performed after the video camera 100 has been powered on (YES in step S1603), then the CPU 109 advances to step S1614. In step S1614, since a clip that has been previously recorded does not exist (that is, seamless recording of a previous clip and the current clip cannot be performed in this case), the CPU 109 encodes the moving image data without performing processing for seamless recording and then records the coded moving image data on the disk 105. Then, the CPU 109 advances to step S1615.

In step S1615, the CPU 109 determines whether the user has generated an instruction for stopping recording. If it is determined in step S1615 that the user has generated an instruction for stopping recording (YES in step S1615), then the CPU 109 advances to step S1616. In step S1616, the CPU 109 stops recording the moving image data stream, and then ends the processing. Then, the CPU 109 advances to step S1610. On the other hand, if it is determined in step S1615 that the user has not generated an instruction for stopping recording (NO in step S1615), then the CPU 109 returns to step S1614 to continue the recording operation.

FIG. 8A illustrates data recorded on the disk 105 and data stored in the non-volatile memory 113 at the time the recording of a first stream 801S has been stopped according to the present exemplary embodiment. In this state, the user has not designated whether to record moving image data to be recorded next with seamless recording.

Accordingly, the CPU 109 stores in the non-volatile memory 113 first clip information 801I, which does not include seamless information, as clip information for the first stream 801S.

On the other hand, if it is determined in step S1603 that the current recording operation is neither the first recording operation performed after the disk 105 has been mounted nor the first recording operation performed after the video camera 100 has been powered on (NO in step S1603), then the CPU 109 advances to step S1604. In step S1604, the CPU 109 determines whether the user has generated an instruction for seamless recording via the operation unit 112.

If it is determined in step S1604 that the user has not generated an instruction for seamless recording (NO in step S1604), then the CPU 109 advances to step S1619. In step S1619, the CPU 109 encodes the moving image data without performing processing for seamless recording, and then records the coded moving image data on the disk 105. Then, the CPU 109 advances to step S1620. In step S1620, the CPU 109 determines whether the user has generated an instruction for stopping recording. If it is determined in step S1620 that the user has not generated an instruction for stopping recording (NO in step S1620), then the CPU 109 returns to step S1619 to continue the recording operation. If it is determined in step S1620 that the user has generated an instruction for stopping recording (YES in step S1620), then the CPU 109 advances to step S1621. In step S1621, the CPU 109 stops recording the moving image data stream. Then, the CPU 109 advances to step S1609.

In step S1609, the CPU 109 reads clip information for the previously recorded clip from the non-volatile memory 113, and then records the read clip information on the disk 105. The CPU then advances to step S1610.

On the other hand, if it is determined in step S1604 that the user has generated an instruction for seamless recording (YES in step S1604), then the CPU 109 advances to step S1605. In step S1605, the CPU 109 causes the encoder 102 to encode the subsequently recorded moving image data such that the subsequently recorded moving image data can be seamlessly reproduced consecutively to the previously recorded moving image data. Then, the CPU 109 records the coded moving image data coded on the disk 105. Then, the CPU advances to step S1606.

In step S1606, the CPU 109 determines whether the user has generated an instruction for stopping recording. If it is determined in step S1606 that the user has generated an instruction for stopping recording (YES in step S1606), then the CPU 109 advances to step S1607. On the other hand, if it is determined in step S1606 that the user has not generated an instruction for stopping recording (NO in step S1606), then the CPU 109 returns to step S1605 to continue the recording operation. In step S1607, the CPU 109 stops recording the moving image data on the disk 105.

In step S1608, the CPU 109 updates the clip information for the previously recorded clip, which has been stored in the non-volatile memory 113. That is, the CPU 109 adds the seamless information for the clip that has been currently recorded to the clip information for the previously recorded clip stored in the non-volatile memory 113.

In step S1609, as described above, the CPU 109 reads the clip information for the previously recorded clip from the non-volatile memory 113, and then records the read clip information on the disk 105.

FIGS. 8B and 8C each illustrate data stored on the disk 105 and data stored in the non-volatile memory 113 after the recording of the second stream has been stopped according to the present exemplary embodiment. In FIG. 8B, a second stream 802S is recorded in a non-seamless state. The first clip information 801I does not include seamless information.

In the case of non-seamless recording, seamless information is not necessary. Accordingly, the CPU 109 records on the disk 105 the first clip information 801I, which has been stored in the non-volatile memory 113, without performing processing for seamless recording.

After recording the first clip information 801I on the disk 105, the first clip information 801I stored in the non-volatile memory 113 becomes unnecessary. Accordingly, the CPU 109 erases the first clip information 801I from the non-volatile memory 113.

FIG. 8C illustrates the second stream 802S that has been recorded with seamless recording according to the present exemplary embodiment. In a case where the second stream 802S is recorded with seamless recording, the CPU 109 adds seamless information to the first clip information 801I and records the first clip information 801I added with the seamless information on the disk 105. After recording the first clip information 801I on the disk 105, the first clip information 801I stored in the non-volatile memory 113 becomes unnecessary. Accordingly, the CPU 109 erases the first clip information 801I from the non-volatile memory 113.

In step S1610, the CPU 109 determines whether the user has generated an instruction for ejecting the disk 105. If it is determined in step S1610 that the user has generated an instruction for ejecting the disk 105 (YES in step S1610), then the CPU 109 advances to step S1617. In step S1617, the CPU 109 records on the disk 105 the clip information stored in the non-volatile memory 113 at this time, and then advances to step S1618. In step S1618, the CPU 109 ejects the disk 105, and then the processing ends. On the other hand, if it is determined in step S1610 that the user has not generated an instruction for ejecting the disk 105 (NO in step 1610), then the CPU 109 advances to step S1611.

In step S1611, the CPU 109 determines whether the user has generated an instruction for powering off the video camera 100. If it is determined in step S1611 that the user has generated an instruction for powering off the video camera 100 (YES in step S1611), then the CPU 109 advances to step S1612. In step S1612, the CPU 109 records on the disk 105 the clip information stored in the non-volatile memory 113 at this time, and then advances to step S1613. In step S1613, the CPU 109 powers off the video camera 100, and then the processing ends.

On the other hand, if it is determined in step S1611 that the user has not generated an instruction for powering off the video camera 100 (NO in step S1611), then the CPU 109 returns to step S1601 and waits until the user generates an instruction for starting recording moving image data.

As described above, in the present exemplary embodiment, the non-volatile memory 113 has a capacity large enough to store only one clip information. Accordingly, no large capacity memory is necessary. Thus, the capacity of the non-volatile memory 113 can be small.

Fifth Exemplary Embodiment

Now, a fifth exemplary embodiment of the present invention will be described below. In the present exemplary embodiment, basic operations of the video camera 100 are similar to those in the first exemplary embodiment.

Figure 9:
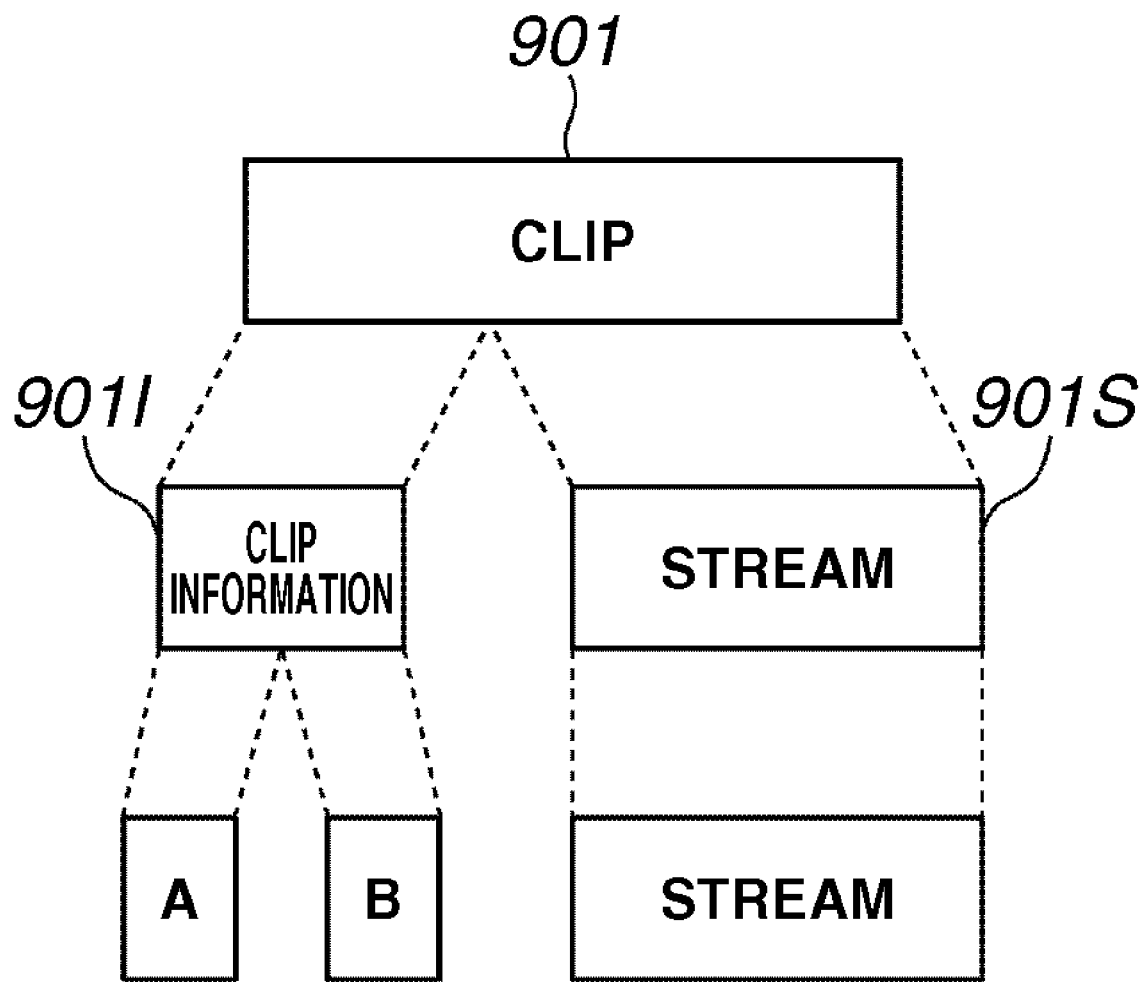
FIG. 9 illustrates a clip and clip information recorded on a recording medium according to a fifth exemplary embodiment of the present invention.

FIG. 9 illustrates an example in which clip information 901I is divided into two blocks, namely, a block A and a block B, according to the present exemplary embodiment. The block A of the clip information 901I in FIG. 9 is equivalent to the clip information A 1001 in FIG. 10. The block B of the clip information 901I in FIG. 9 is equivalent to the clip information B 1002 in FIG. 10.

In FIG. 10, seamless information is included in the description "ClipInfo( )" in the clip information A 1001. Accordingly, a content of the clip information A 1001 varies according to whether the next clip is to be recorded with seamless recording or non-seamless recording.

A content of the clip information B 1002 is not related to whether the next clip is to be recorded by seamless recording or non-seamless recording and does not vary according thereto. That is, the content of the clip information B 1002 is determined before recording the next clip.

Accordingly, the clip information A 1001 cannot be recorded on the disk 105 until whether the next clip is to be recorded with seamless recording or non-seamless recording is designated by the user. On the other hand, the clip information B 1002 can be recorded before whether the next clip is to be recorded with seamless recording or non-seamless recording is designated by the user. In this regard, in the present exemplary embodiment, the CPU 109 records the clip information B 1002 while storing the clip information A 1001 in the non-volatile memory 113 at the time of recording a stream.

The operation according to the present exemplary embodiment will be described below with reference to a flow chart illustrated in FIG. 17 and to FIGS. 11A through 11C.

Figure 17:
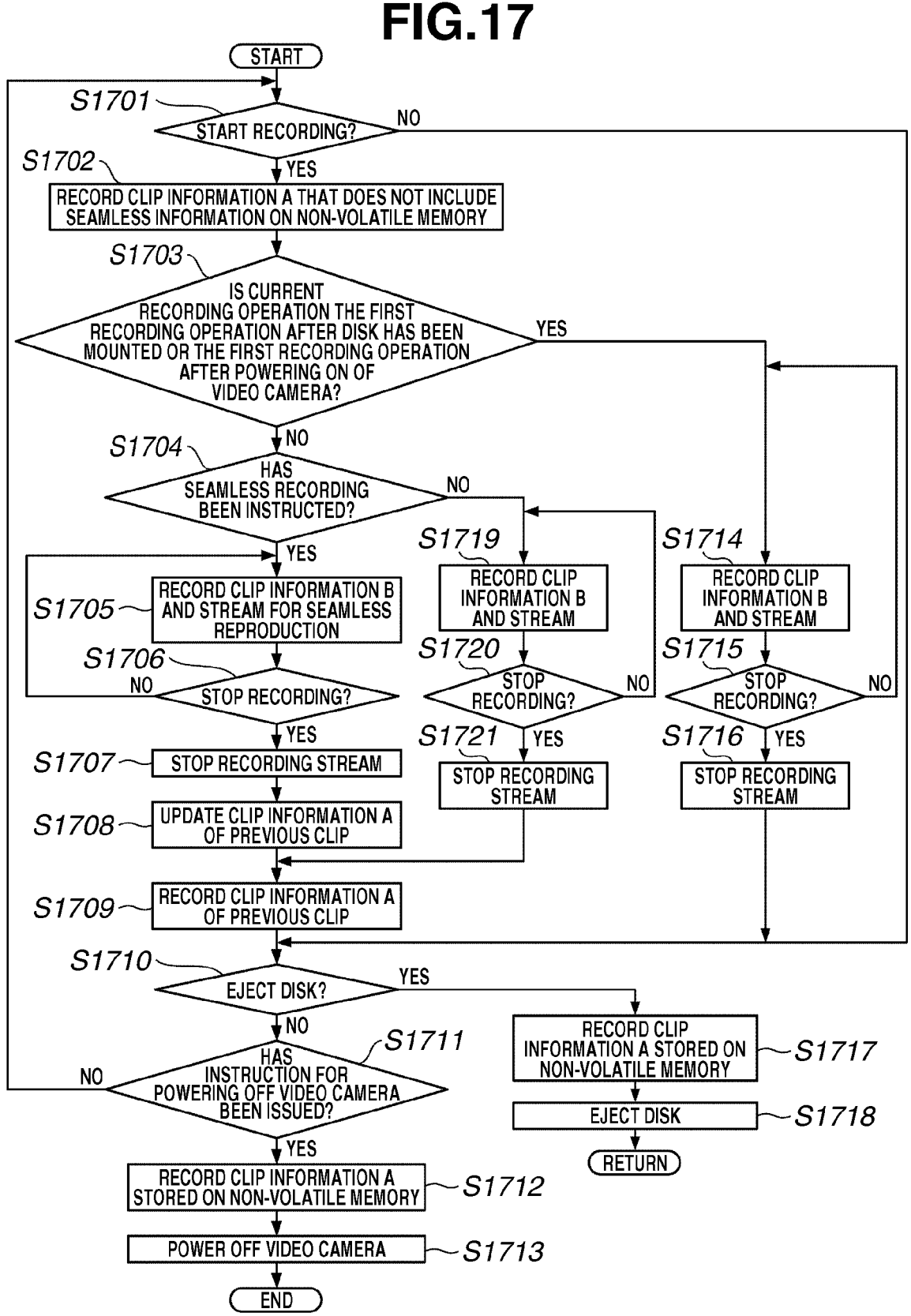
FIG. 17 is a flow chart illustrating an exemplary operation performed by the video camera according to the fifth exemplary embodiment of the present invention.

Referring to FIG. 17, in a state where the recording of moving image data is currently stopped, in step S1701, the CPU 109 determines whether the user has generated an instruction for starting recording via the operation unit 112. If it is determined in step S1701 that the user has generated an instruction for starting recording (YES in step S1701), then the CPU 109 advances to step S1702. On the other hand, if it is determined in step S1701 that the user has not generated an instruction for starting recording (NO in step S1701), then the CPU 109 advances to step S1710. In step S1702, the CPU 109 generates clip information A that does not include seamless information and stores the generated clip information A in the non-volatile memory 113. Then, the CPU 109 advances to step S1703.

In step S1703, the CPU 109 determines whether the current recording operation is the first recording operation performed after the disk 105 has been mounted or the first recording operation performed after the video camera 100 has been powered on.

If it is determined in step S1703 that the current recording operation is the first recording operation performed after the disk 105 has been mounted or the first recording operation performed after the video camera 100 has been powered on (YES in step S1703), then the CPU 109 advances to step S1714. In step S1714, since a clip that has been previously recorded does not exist (that is, seamless recording of a previous clip and the current clip cannot be performed in this case), the CPU 109 encodes the moving image data without performing processing for seamless recording and then records the coded moving image data, together with the clip information B, on the disk 105. Then, the CPU 109 advances to step S1715.

In step S1715, the CPU 109 determines whether the user has generated an instruction for stopping recording. If it is determined in step S1715 that the user has generated an instruction for stopping recording (YES in step S1715), then the CPU 109 advances to step S1716. In step S1716, the CPU 109 stops recording the moving image data stream. Then, the CPU 109 advances to step S1710. On the other hand, if it is determined in step S1715 that the user has not generated an instruction for stopping recording (NO in step S1715), then the CPU 109 returns to step S1714 to continue the recording operation.

Figure 11A:
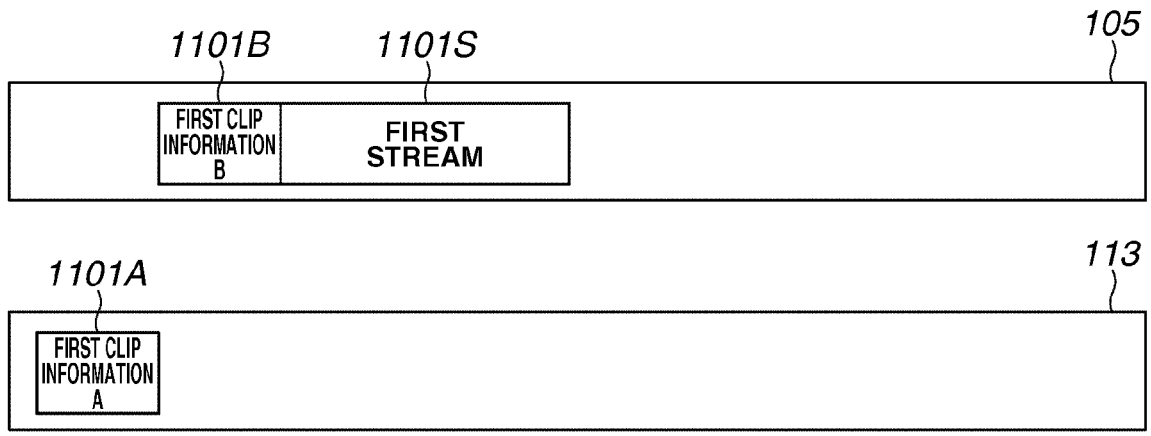
FIGS. 11A through 11C each illustrate a clip recorded on a recording medium according to the fifth exemplary embodiment of the present invention.

FIG. 11A illustrates data (1101B and 1101S) recorded on the disk 105 and data (1101A) stored in the non-volatile memory 113 at the time the recording of a first stream 1101I is stopped according to the present exemplary embodiment. In this state, the user has not designated whether moving image data to be recorded next is to be recorded with seamless recording.

The content of the clip information B does not vary regardless of whether the clip is recorded with seamless recording or non-seamless recording. Accordingly, the CPU 109 records the clip information B on the disk 105, leaving an area in which the clip information A is to be written.

According to a type of the disk 105, the data is recorded for each predetermined amount of data. In this case, the CPU 109, in recording the clip information A in the following manner, adds NULL data (padding data) to a portion of data whose data amount is smaller than the predetermined data amount for recording, to adjust the data amount. For example, the unit of data amount for recording data is 32K byte in the case of a DVD.

On the other hand, the CPU 109 stores in the non-volatile memory 113 first clip information 1101A, which does not include seamless information, as the clip information A for the first stream 1101S.

If it is determined in step S1703 that the current recording operation is neither the first recording operation performed after the disk 105 has been mounted nor the first recording operation performed after the video camera 100 has been powered on (NO in step S1703), then the CPU 109 advances to step S1704. In step S1704, the CPU 109 determines whether the user has generated an instruction for recording moving image data with seamless recording via the operation unit 112.

If it is determined in step S1704 that the user has not generated an instruction for recording moving image data with seamless recording (NO in step S1704), then the CPU 109 advances to step S1719. In step S1719, the CPU 109 encodes the moving image data without performing processing for seamless recording, and then records the coded moving image data, together with the clip information B, on the disk 105. Then, the CPU 109 advances to step S1720.

In step S1720, the CPU 109 determines whether the user has generated an instruction for stopping recording. If it is determined in step S1720 that the user has generated an instruction for stopping recording (YES in step S1720), then the CPU 109 advances to step S1721. In step S1721, the CPU 109 stops recording the moving image data stream, and then ends the recording processing. Then, the CPU 109 advances to step S1709. On the other hand, if it is determined in step S1720 that the user has not generated an instruction for stopping recording (NO in step S1720), the CPU 109 returns to step S1719 to continue the recording operation.

In step S1709, the CPU 109 reads the clip information A for the previously recorded clip from the non-volatile memory 113, and then records the read clip information A on the disk 105.

On the other hand, if it is determined in step S1704 that the user has generated an instruction for recording moving image data with seamless recording (YES in step S1704), then the CPU 109 advances to step S1705. In step S1705, the CPU 109 causes the encoder 102 to encode the subsequently recorded moving image data such that the subsequently recorded moving image data can be seamlessly reproduced consecutively to the previously recorded moving image data. Then, the CPU 109 records the coded moving image data, together with the clip information B, on the disk 105. Then, the CPU 109 advances to step S1706.

In step S1706, the CPU 109 determines whether the user has generated an instruction for stopping recording. If it is determined in step S1706 that the user has generated an instruction for stopping recording (YES in step S1706), then the CPU 109 advances to step S1707. On the other hand, if it is determined in step S1706 that the user has not generated an instruction for stopping recording (No in step S1706), then the CPU 109 returns to step S1705 to continue the recording operation. In step S1707, the CPU 109 stops recording the moving image data on the disk 105, and then advances to step S1708.

In step S1708, the CPU 109 updates the clip information A for the previously recorded clip, which has been stored in the non-volatile memory 113, and stores in the non-volatile memory 113 the updated clip information A including seamless information for the clip that has been currently recorded. Then, the CPU 109 advances to step S1709.

In step S1709, the CPU 109 reads the clip information A for the previously recorded clip from the non-volatile memory 113, and then records the read clip information A on the disk 105. Then, the CPU 109 advances to step S1710. In step S1710, the CPU 109 determines whether the user has generated an instruction for ejecting the disk 105.

If it is determined in step S1710 that the user has generated an instruction for ejecting the disk 105 (YES in step S1710), then the CPU 109 advances to step S1717. In step S1717, the CPU 109 records the clip information A stored in the non-volatile memory 113 at a position on the disk 105 designated by the user, and then advances to step S1718. In step S1718, the CPU 109 ejects the disk 105. Then, the processing ends.

On the other hand, if it is determined in step S1710 that the user has not generated an instruction for ejecting the disk 105 (NO in step S1710), then the CPU 109 advances to step S1711. In step S1711, the CPU 109 determines whether the user has generated an instruction for powering off the video camera 100.

If it is determined in step S1711 that the user has not generated an instruction for powering off the video camera 100 (NO in step S1711), then the CPU 109 returns to step S1701. If it is determined in step S1711 that the user has generated an instruction for powering off the video camera 100 (YES in step S1711), then the CPU 109 advances to step S1712. In step S1712, the CPU 109 records the clip information A stored in the non-volatile memory 113 at a position on the disk 105 previously designated by the user. Then, the CPU 109 advances to step S1713. In step S1713, the CPU 109 powers off the video camera 100. Then, the processing ends.

Figure 11B:
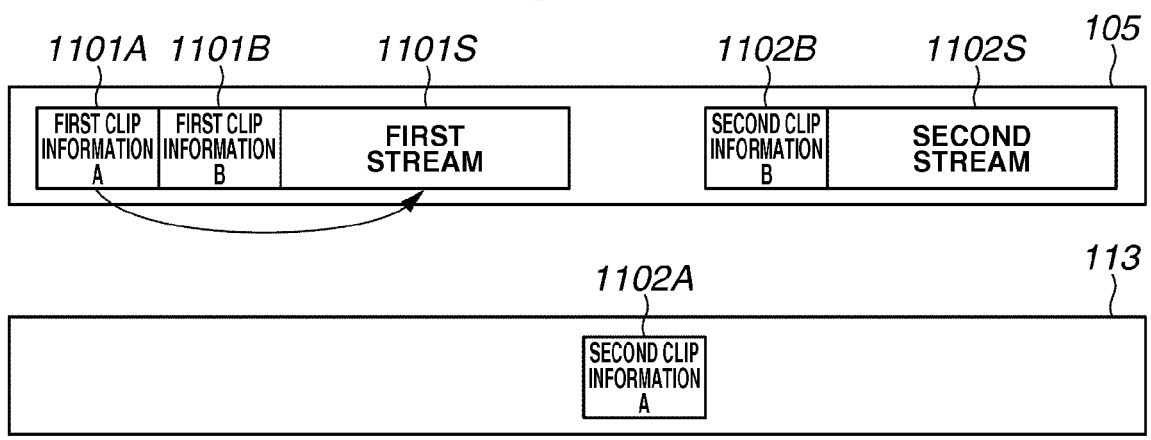
Figure 11C:
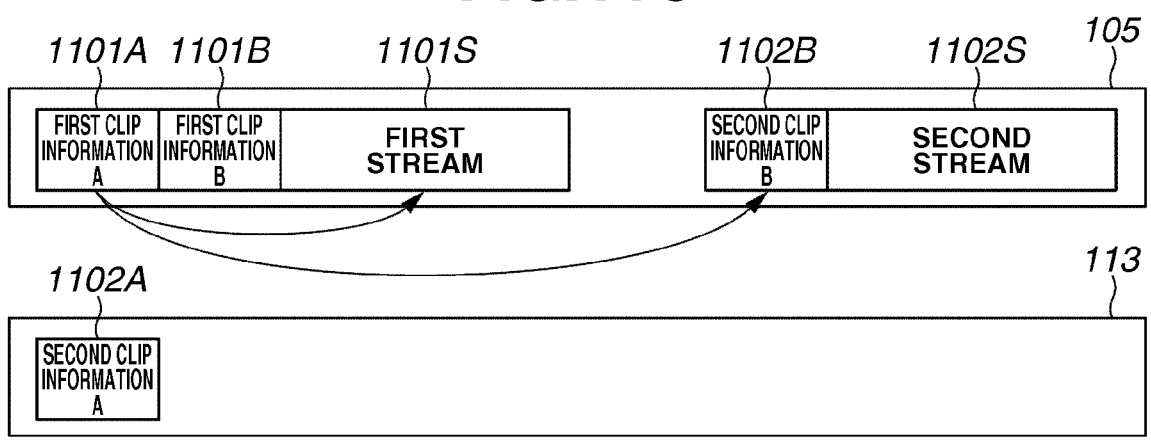

FIGS. 11B and 11C each illustrate data (1101A, 1101B, 1101S, 1102B, and 1102S) recorded on the disk 105 and data (1102A) stored in the non-volatile memory 113 at the time the recording of a second stream is stopped according to the present exemplary embodiment.

FIG. 11B illustrates a second stream 1102S that has been recorded with non-seamless recording. In FIG. 11B, the first clip information 1101A does not include seamless information.

In the case of non-seamless recording, seamless information is not necessary. Accordingly, after recording the second stream 1102S, the CPU 109 records, in an area on the disk 105 which has been previously left free, the first clip information 1101A that has been stored in the non-volatile memory 113 without performing processing for seamless recording.

After recording the first clip information 1101A on the disk 105, the first clip information 1101A stored in the non-volatile memory 113 becomes unnecessary. Accordingly, the CPU 109 erases the first clip information 1101A from the non-volatile memory 113.

FIG. 11C illustrates a second stream 1102S that has been recorded with seamless recording according to the present exemplary embodiment. In a case where the second stream 1102S is recorded with seamless recording, the CPU 109 adds seamless information to the first clip information 1101A and records the first clip information 1101A added with the seamless information on the disk 105. After recording the first clip information 1101A on the disk 105, the first clip information 1101A stored in the non-volatile memory 113 becomes unnecessary. Accordingly, the CPU 109 erases the first clip information 1101A from the non-volatile memory 113.

As described above, according to the present exemplary embodiment, seamless information can be recorded on the disk 105 without wasting a recording area on the disk 105.

Other Exemplary Embodiments

Each unit constituting the moving image recording apparatus and each step in the moving image recording method according to an exemplary embodiment of the present invention can be implemented by executing a program stored in a RAM or a ROM of a computer with a CPU of the computer.

The present invention can be implemented in a system, an apparatus, a method, a program, or a storage medium storing the program, for example. More specifically, the present invention can be applied to a system including a plurality of devices and to an apparatus that includes one device.

The present invention can be implemented by directly or remotely supplying a program (software) implementing functions of the above-described exemplary embodiments (in the exemplary embodiments, the program corresponding to the processing performed according to the flow charts in FIGS. 13 through 17) to a system or an apparatus and reading and executing supplied program code with the system or a computer of the apparatus.

The program can be configured in any form, such as object code, a program executed by an interpreter, and script data supplied to an operating system (OS).

As the recording medium for supplying such program code, a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a DVD (a DVD-read only memory (DVD-ROM) and a DVD-R), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium, such as a hard disk.

The functions of the above-described embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium, such as a CD-ROM, which stores the program according to the present invention after an encryption thereof; by allowing the user who is qualified for a prescribed condition to download key information for decoding the encryption from the web site via the Internet; and by executing and installing on the computer the encrypted program code by using the key information.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, after the program code read from the recording medium is written in a memory provided in a function expansion board inserted in a computer or a function expansion unit connected to the computer, a CPU and the like provided in the function expansion board or the function expansion unit can carry out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-244505 filed Sep. 8, 2006 and No. 2007-192164 filed Jul. 24, 2007, which are hereby incorporated by reference herein in their entirety.

What is claimed is:

1. A recording apparatus comprising:
a coding unit configured to code input moving image data to reduce an amount of information of the input moving image data;
a recording unit configured to record moving image data on a recording medium;
a management information generation unit configured to generate management information for first moving image data in response to the recording unit recording the first moving image data on the recording medium;
a consecutive reproduction information generation unit configured to generate first consecutive reproduction information indicating second moving image data to be reproduced consecutively after the first moving image data in response to the recording unit recording the second moving image data on the recording medium on which the first moving image data is recorded;
a control unit configured to, in response to the recording unit recording the second moving image data on the recording medium, control the recording unit to add the first consecutive reproduction information to the management information for the first moving image data and to record the management information added with the first consecutive reproduction information on the recording medium; and
a designation unit configured to designate whether the second moving image data is to be reproduced consecutively after the first moving image data,
wherein, if it is designated by the designation unit that the second moving image data is not to be reproduced consecutively after the first moving image data, the consecutive reproduction information generation unit stops generating the first consecutive reproduction information and the control unit controls the recording unit to record the management information for the first moving image data on the recording medium without adding the first consecutive reproduction information, and
wherein, if it is designated by the designation unit that the second moving image data is to be reproduced consecutively after the first moving image data, the coding unit controls an amount of code of the second moving image data based on an amount of code of the first moving image data at a time when recording of the first moving image data is stopped.

2. The recording apparatus according to claim 1, wherein the control unit controls the recording unit to record the management information for the first moving image data without adding the first consecutive reproduction information in response to the recording unit recording the first moving image data on the recording medium, and to update the management information for the first moving image data recorded on the recording medium based on the management information for the first moving image data added with the first consecutive reproduction information in response to the recording unit recording the second moving image data on the recording medium.

3. The recording apparatus according to claim 1, further comprising a memory,
wherein the management information generation unit generates management information for the second moving image data and stores the management information for the first moving image data and the management information for the second moving image data in the memory, and
wherein the control unit controls the recording unit to read from the memory and record on the recording medium the management information for the first moving image data, the management information for the second moving image data, and the first consecutive reproduction information, at a predetermined timing after the second moving image data is recorded on the recording medium.

4. The recording apparatus according to claim 1, further comprising a memory,
wherein the management information generation unit stores the management information for the first moving image data generated by the management information generation unit in the memory in response to the recording unit recording the first moving image data on the recording medium, and
wherein, in response to the recording unit recording the second moving image data on the recording medium, the control unit controls the recording unit to read from the memory the management information for the first moving image data, to add the first consecutive reproduction information to the read management information for the first moving image data, and to record the management information added with the first consecutive reproduction information on the recording medium.

5. The recording apparatus according to claim 4,
wherein, if it is designated by the designation unit that the second moving image data is not to be reproduced consecutively after the first moving image data, in response to the recording unit recording the second moving image data on the recording medium, the control unit controls the recording unit to read from the memory the management information for the first moving image data and to record on the recording medium the read management information for the first moving image data without adding the first consecutive reproduction information.

6. The recording apparatus according to claim 1, further comprising a memory,
wherein the management information includes a first portion including the consecutive reproduction information and a second portion that does not include the consecutive reproduction information,
wherein the management information generation unit stores the first portion of the management information for the first moving image generated in the memory in response to the recording unit recording the first moving image data on the recording medium, and
wherein the control unit controls the recording unit to record on the recording medium the second portion of the management information for the first moving image data in response to the recording unit recording the first moving image data on the recording medium, and to read the first portion of the management information for the first moving image data from the memory, add the first consecutive reproduction information to the read first portion of the management information for the first moving image data, and record the first portion of the management information for the first moving image data added with the first consecutive reproduction information on the recording medium in response to the recording unit recording the second moving image data on the recording medium.

7. A recording apparatus comprising:
a recording unit configured to record moving image data on a recording medium, the recording unit including an ejection mechanism configured to eject the recording medium to an outside of the recording apparatus;
a management information generation unit configured to generate management information for the moving image data recorded on the recording medium, the management information generation unit generating management information for first moving image data including first consecutive reproduction information indicating second moving image data to be reproduced consecutively after the first moving image data in response to the recording unit recording the first moving image data on the recording medium; and
a control unit configured to, in response to the recording unit recording the first moving image data on the recording medium, control the recording unit to record the management information for the first moving image data on the recording medium before the second moving image data is recorded on the recording medium,
wherein, if an instruction for ejecting the recording medium is generated before the second moving image data indicated by the first consecutive reproduction information is recorded on the recording medium, the management information generation unit generates management information for the first moving image data that does not include the first consecutive reproduction information, and
wherein the control unit controls the recording unit to eject the recording medium with the ejection mechanism after overwriting the previously recorded management information for the first moving image data with the management information for the first moving image data that does not include the first consecutive reproduction information.

8. The recording apparatus according to claim 7, wherein the recording unit records the second moving image data on the recording medium on which the first moving image data is recorded according to the first consecutive reproduction information.

9. A recording apparatus comprising:
a recording unit configured to record moving image data on a recording medium;
a management information generation unit configured to generate management information for the moving image data recorded on the recording medium, the management information generation unit generating management information for first moving image data including first consecutive reproduction information indicating second moving image data to be reproduced consecutively after the first moving image data in response to the recording unit recording the first moving image data on the recording medium; and a control unit configured to, in response to the recording unit recording the first moving image data on the recording medium, control the recording unit to record the management information for the first moving image data on the recording medium before the second moving image data is recorded on the recording medium, wherein, if an instruction for powering off the recording apparatus is generated before the second moving image data indicated by the first consecutive reproduction information is recorded on the recording medium, the management information generation unit generates management information for the first moving image data that does not include the first consecutive reproduction information, and wherein the control unit controls the recording unit to overwrite the previously recorded management information for the first moving image data with the management information for the first moving image data that does not include the first consecutive reproduction information.

10. A recording apparatus comprising:

a recording unit configured to record moving image data on a recording medium;

a control unit configured to control the recording unit to record one clip of the moving image data on the recording medium responsive to a recording start instruction; and a generation unit configured to generate discrimination information for discriminating whether the one clip and a next clip to the one clip recorded on the recording medium can be reproduced consecutively, wherein the control unit controls the recording unit to record the discrimination information of the one clip of moving image data generated by the generation unit on the recording medium responsive to the recording start instruction, wherein the control unit, responsive to the recording start instruction of a first clip, controls the generation unit to generate the discrimination information of the first clip indicating that the consecutive reproduction cannot be performed and controls the recording unit to record the discrimination information of the first clip generated by the generation unit and the first clip of the moving image data on the recording medium, and wherein the control unit controls the recording unit to change the discrimination information of the first clip recorded on the recording medium so that the discrimination information of the first clip indicates that the consecutive reproduction can be performed in accordance with the recording unit stopping recording a second clip of the moving image data to be reproduced next to the first clip of the moving image data.

11. The recording apparatus according to claim 10, wherein the control unit does not change the discrimination information of the first clip recorded on the recording medium after the recording unit stops recording the second clip of the moving image data if it is determined that the first clip and the second clip are not to be reproduced consecutively.

12. The recording apparatus according to claim 10, further comprising:

a coding unit configured to code input moving image data, wherein the recording unit records the moving image data coded by the coding unit, and the coding unit controls a code amount of the second clip of the moving image data in accordance with the code amount of the first clip of the moving image data at a time when recording of the first clip of the moving image data is stopped.

* * * * *